(12) United States Patent
Shinohara

(10) Patent No.: US 8,390,941 B2
(45) Date of Patent: Mar. 5, 2013

(54) IMAGING LENS, IMAGING APPARATUS AND PORTABLE TERMINAL DEVICE

(75) Inventor: Yoshikazu Shinohara, Saitama (JP)

(73) Assignee: FUJINON Corporation, Saitama (JP)

( * ) Notice: Subject to any disclaimer, the term of this patent is extended or adjusted under 35 U.S.C. 154(b) by 211 days.

(21) Appl. No.: 12/755,016

(22) Filed: Apr. 6, 2010

(65) Prior Publication Data

US 2010/0254029 A1    Oct. 7, 2010

(30) Foreign Application Priority Data

Apr. 7, 2009    (JP) .................. P2009-093136
Mar. 23, 2010   (JP) .................. P2010-065645

(51) Int. Cl.
*G02B 13/18*    (2006.01)
*G02B 9/60*     (2006.01)

(52) U.S. Cl. ......................... 359/714; 359/764

(58) Field of Classification Search .......... 359/763–764, 359/754–759, 771–772, 776, 713–714
See application file for complete search history.

(56) References Cited

U.S. PATENT DOCUMENTS

| | | | | |
|---|---|---|---|---|
| 4,394,071 A | * | 7/1983 | Yamada ....................... | 359/675 |
| 4,596,447 A | * | 6/1986 | Yamada et al. ............... | 359/674 |
| 4,668,054 A | * | 5/1987 | Takase et al. ................ | 359/674 |
| 4,715,693 A | * | 12/1987 | Takase et al. ................ | 359/675 |
| 4,772,106 A | * | 9/1988 | Ogata et al. .................. | 359/692 |
| 5,257,135 A | * | 10/1993 | Kohno et al. ................. | 359/689 |
| 7,502,181 B2 | | 3/2009 | Shinohara | |
| 7,583,441 B2 | * | 9/2009 | Taki ............................. | 359/557 |
| 7,710,665 B2 | | 5/2010 | Park et al. | |
| 7,864,454 B1 | * | 1/2011 | Tang et al. .................... | 359/764 |
| 2007/0229984 A1 | | 10/2007 | Shinohara | |
| 2007/0236811 A1 | | 10/2007 | Mori | |
| 2010/0134904 A1 | * | 6/2010 | Tsai ............................. | 359/764 |
| 2010/0214467 A1 | | 8/2010 | Ohtsu | |
| 2010/0220229 A1 | | 9/2010 | Sano | |
| 2010/0254029 A1 | | 10/2010 | Shinohara | |
| 2011/0013069 A1 | * | 1/2011 | Chen ............................ | 348/335 |
| 2011/0134305 A1 | * | 6/2011 | Sano et al. ................... | 348/340 |

FOREIGN PATENT DOCUMENTS

| | | |
|---|---|---|
| JP | 3788133 B2 | 6/2006 |
| JP | 2007-264180 A | 10/2007 |
| JP | 2007-279282 A | 10/2007 |
| WO | WO 2010/024198 | * 3/2010 |

* cited by examiner

*Primary Examiner* — Jordan Schwartz
(74) *Attorney, Agent, or Firm* — Birch, Stewart, Kolasch & Birch, LLP

(57) ABSTRACT

An imaging lens is provided and includes: in order from the object side, a first lens having a positive refractive power; a second lens having a negative refractive power; a third lens having a convex surface on the image side near the optical axis and having a positive refractive power; a fourth lens having a positive refractive power near the optical axis; and a fifth lens having a negative refractive power near the optical axis. An image side surface of the fifth lens is concave near the optical axis and has a region where a negative power of the region decreases toward a periphery of the fifth lens as compared with a negative power near the optical axis.

9 Claims, 18 Drawing Sheets

EXAMPLE 1

FIG. 1  EXAMPLE 1
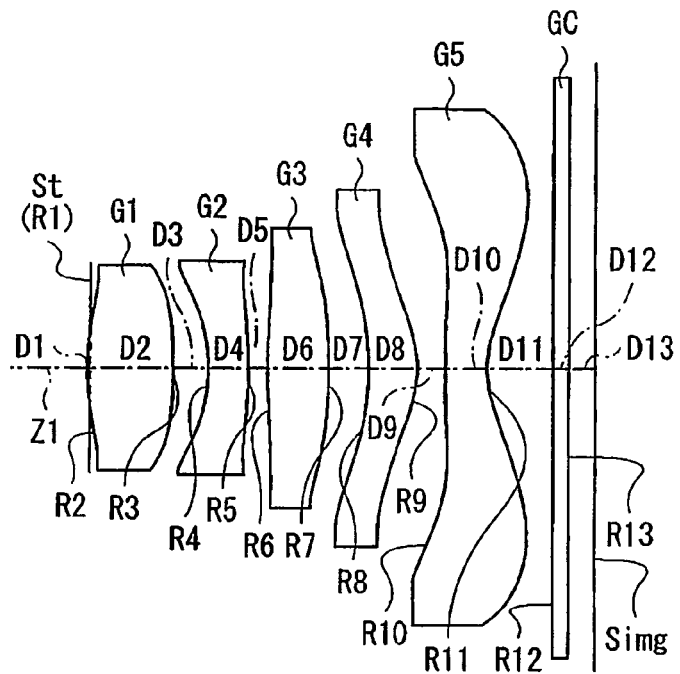
FIG. 2  EXAMPLE 2
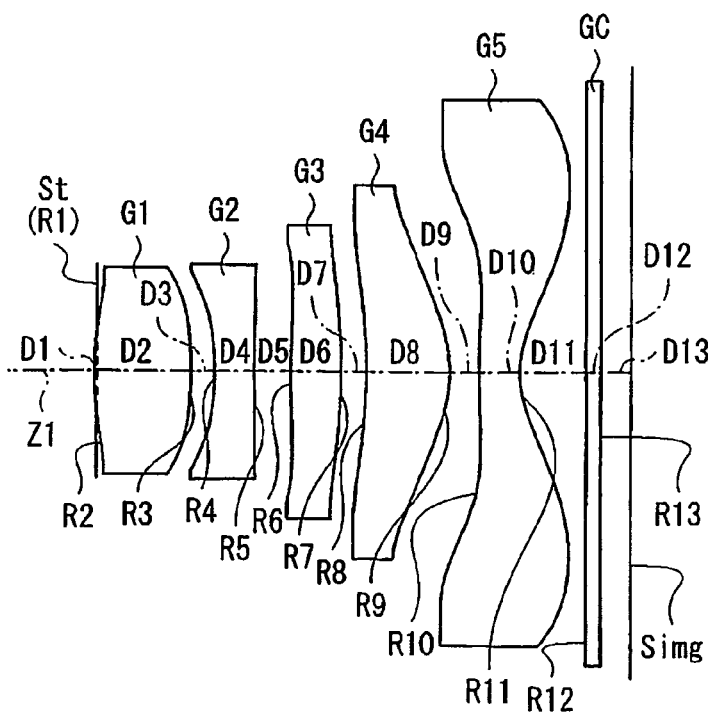

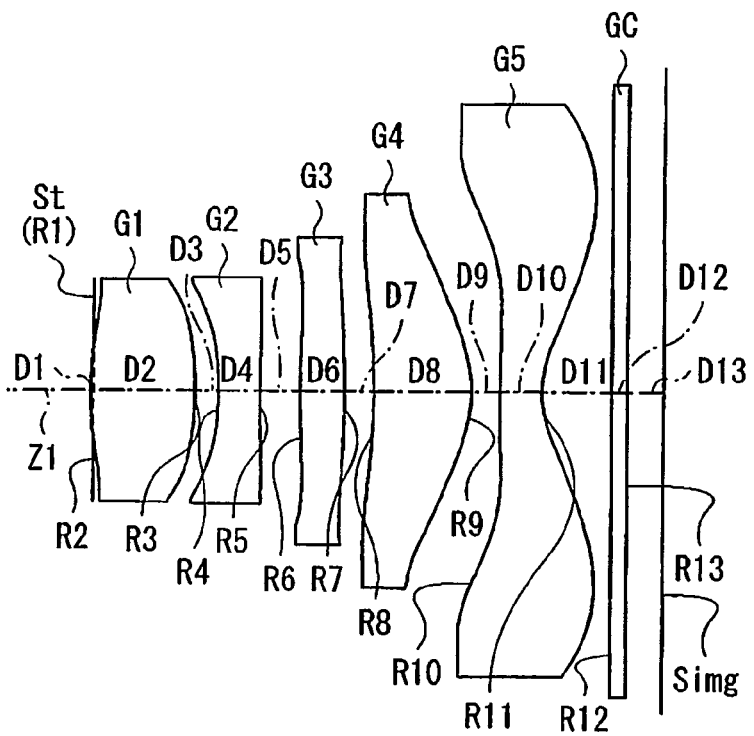
FIG. 3 EXAMPLE 3
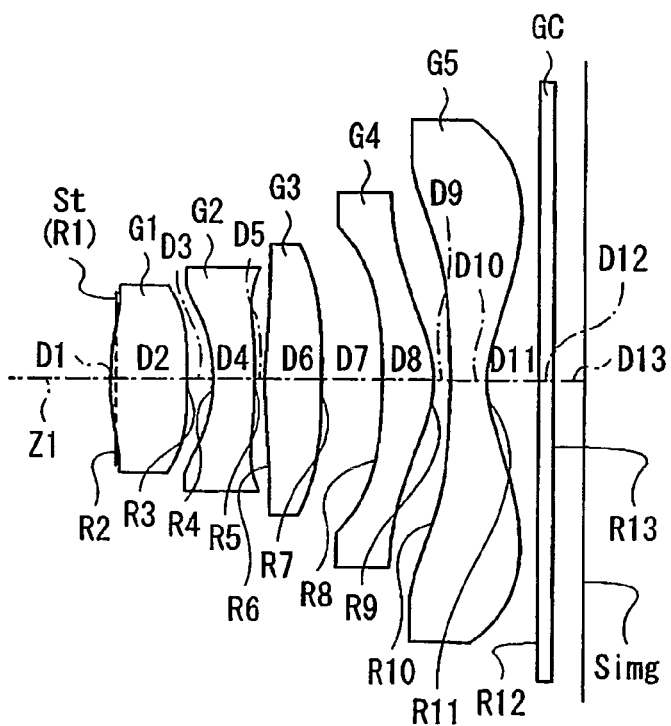
FIG. 4 EXAMPLE 4

FIG. 5  EXAMPLE 5
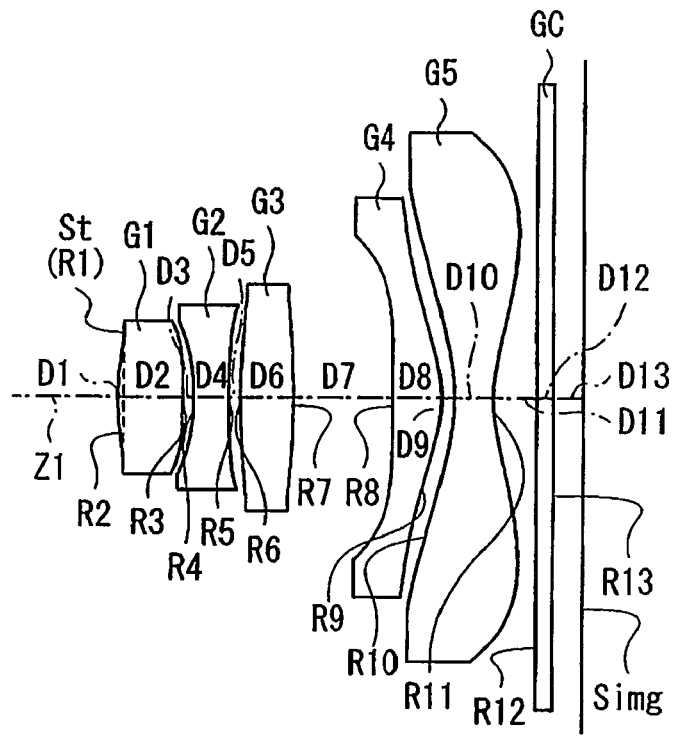
FIG. 6  EXAMPLE 6
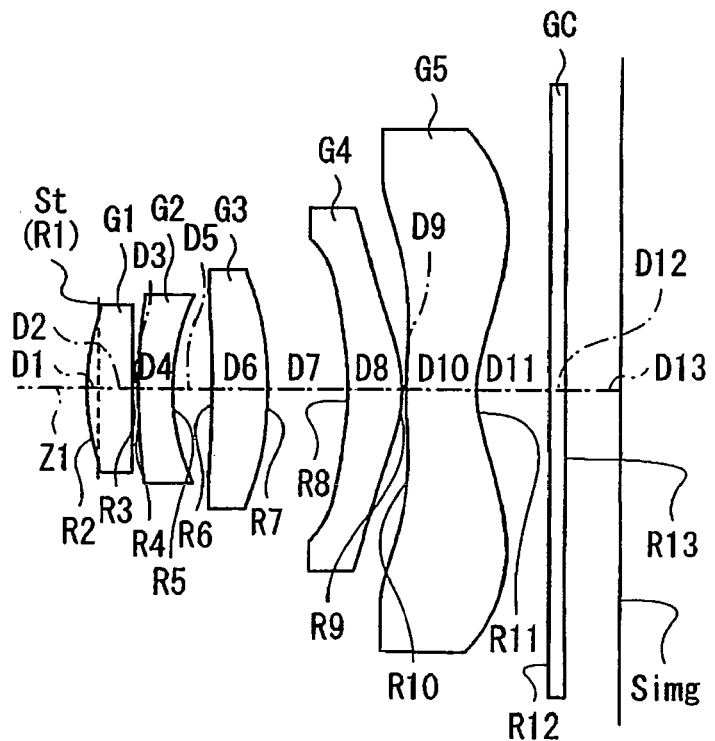

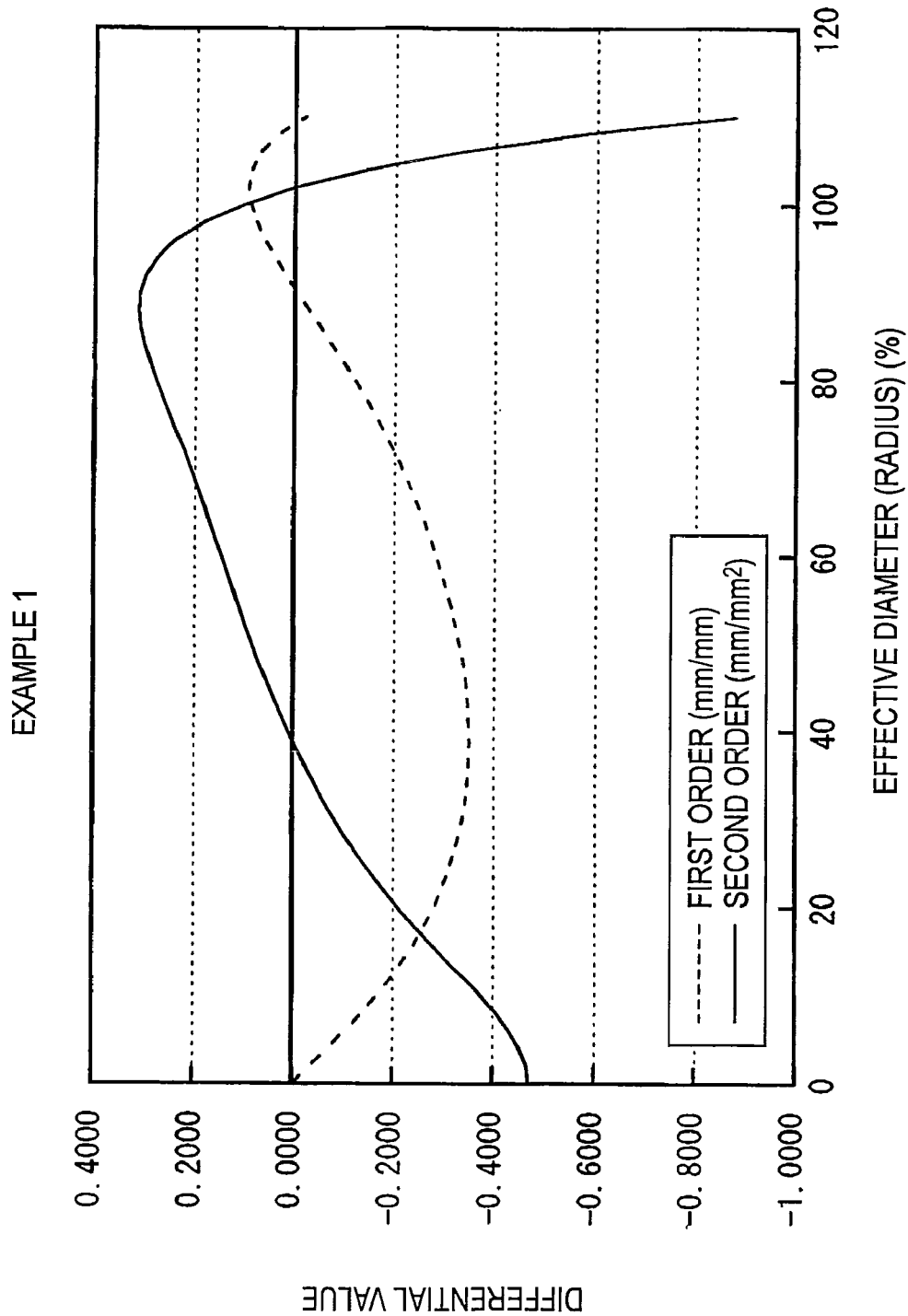

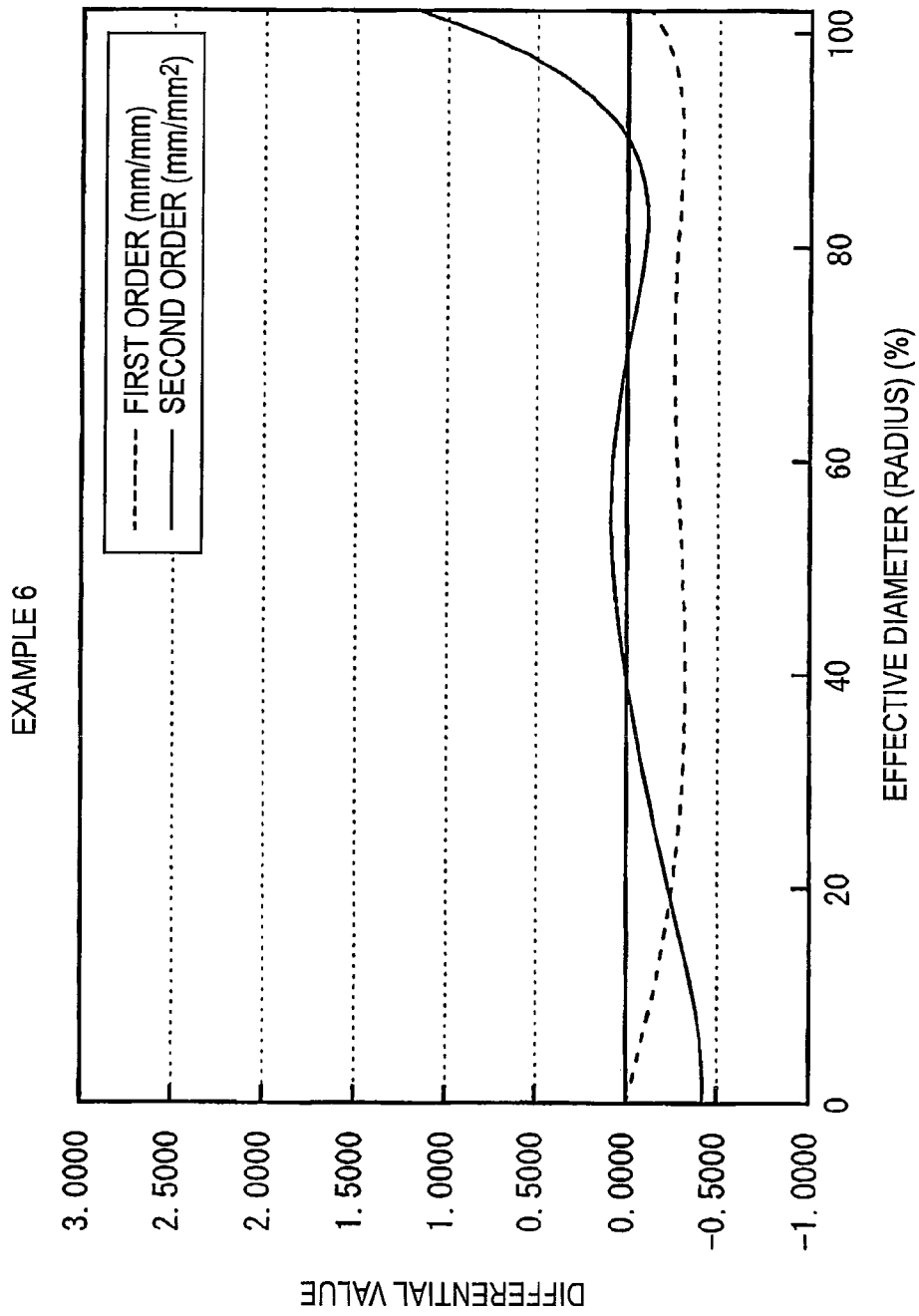

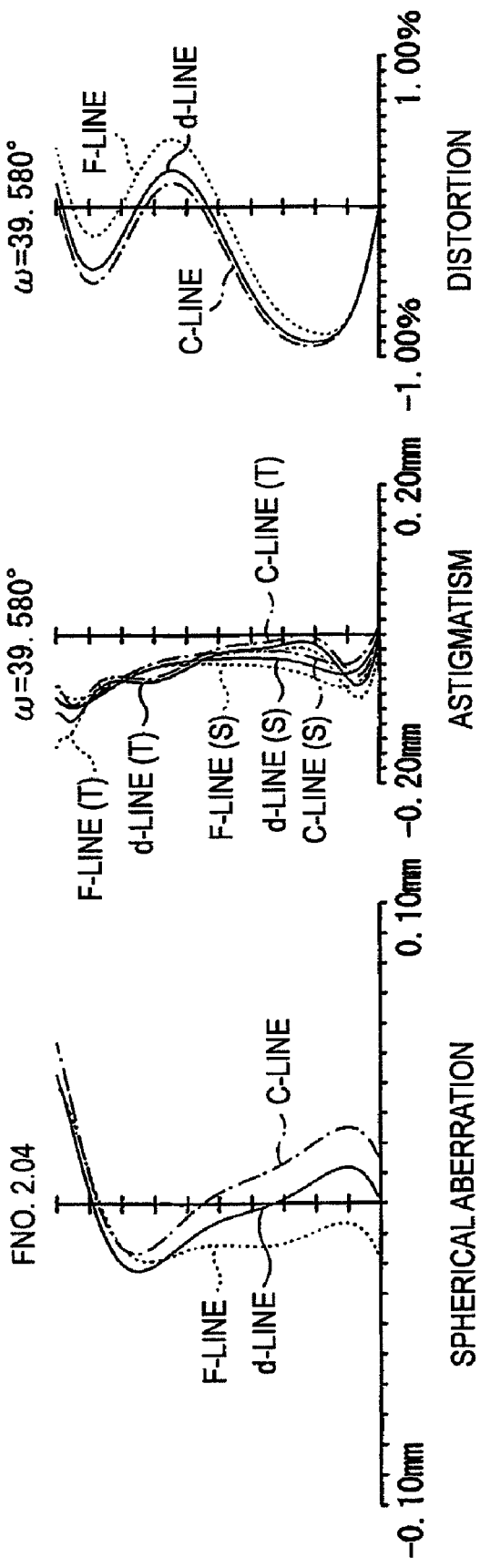

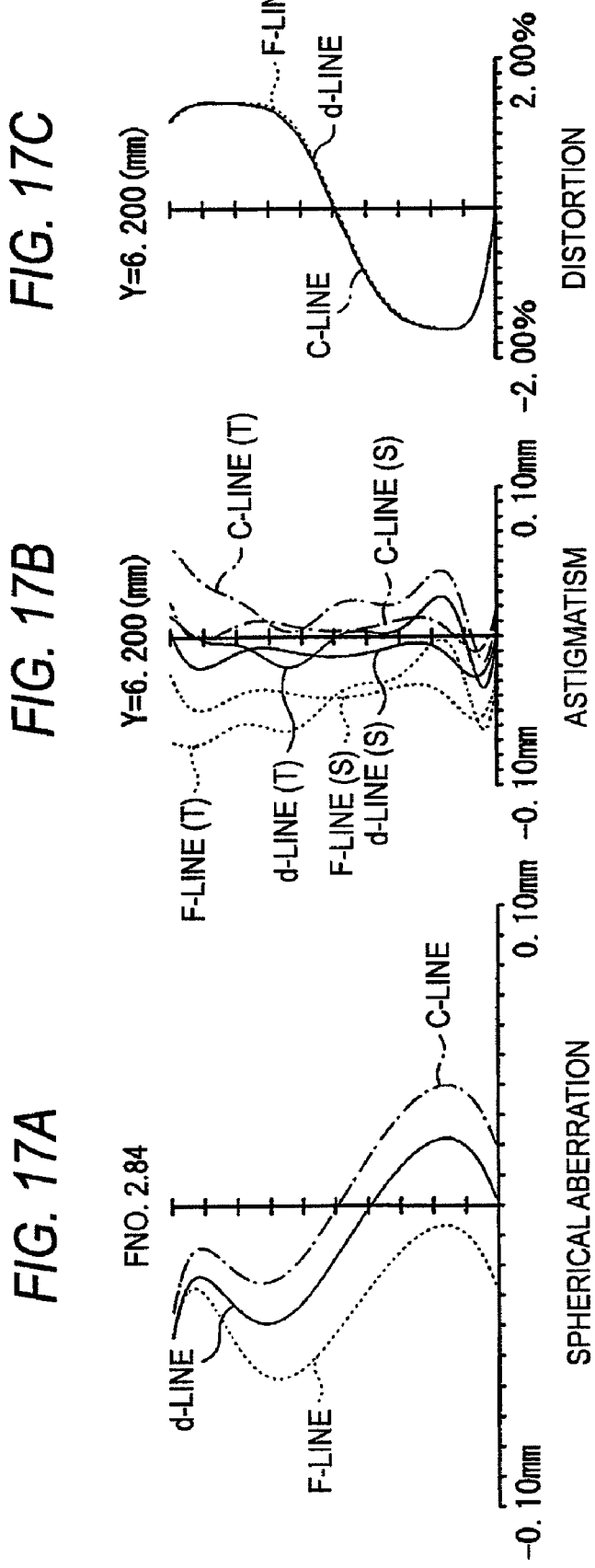

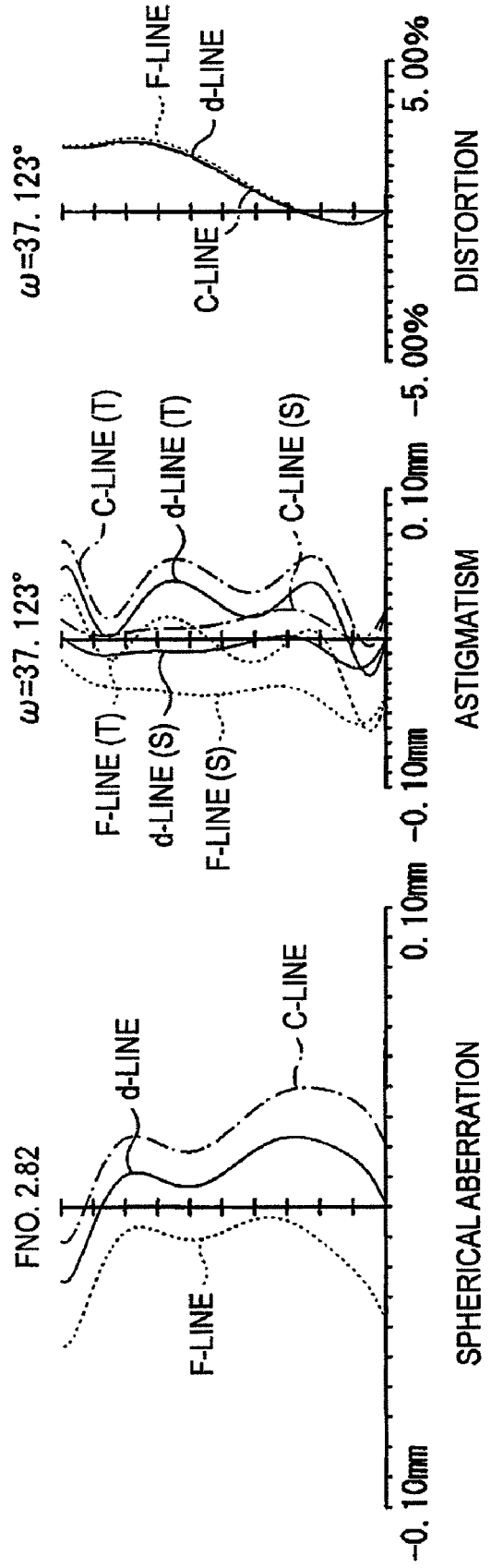

IMAGING LENS, IMAGING APPARATUS AND PORTABLE TERMINAL DEVICE

This application is based on and claims priority under 35 U.S.C §119 from Japanese Patent Application Nos. 2009-093136, and 2010-065645, filed on Apr. 7, 2009 and Mar. 23, 2010, respectively, the entire disclosure of which is herein incorporated by reference.

BACKGROUND OF THE INVENTION

1. Field of the Invention

The present invention relates to an imaging lens that forms an optical image of a subject on an imaging device such as a CCD (Charge Coupled Device) or a CMOS (Complementary Metal Oxide Semiconductor), and an imaging apparatus such as a digital still camera that performs photographing with the imaging lens mounted therein, and a portable terminal device such as a cellular phone equipped with a camera and a portable information terminal (PDA: Personal Digital Assistance).

2. Description of Related Art

In recent years, as personal computers have become popular in homes, digital still cameras which are capable of transferring image information about photographed scenes, persons, and the like into the personal computers have spread rapidly. In addition, the incorporation of a camera module for inputting images into a cellular phone has been increasing. In these imaging apparatuses, imaging devices such as a CCD and a CMOS are used. In such imaging apparatuses, recently, because the imaging device has been reduced in size, a reduction in size of the whole of the imaging apparatus and an imaging lens mounted therein has also been required. Also, since the number of pixels included in the imaging device has also been increasing, the enhancing of the resolution and performance of the imaging device has been required. In order to cope with the requirements, in the past, an imaging lens was developed which was configured to have a total of four lenses. In contrast, recently, there is a tendency of increasing the number of lenses in order to achieve higher resolution and higher performance.

Japanese Patent No. 3788133, JP-A-2007-264180, and JP-A-2007-279282 disclose imaging lenses in which high performance is achieved by using five lenses. However, recently, further high performance has been required even for the disclosed imaging lenses.

SUMMARY OF THE INVENTION

An object of the invention is to provide an imaging lens capable of achieving high resolution performance, an imaging apparatus, and a potable terminal device.

According to an aspect of the invention, there is provided an imaging lens including: in order from an object side thereof, a first lens having a positive refractive power; a second lens having a negative refractive power; a third lens having a convex surface on an image side near the optical axis thereof and having a positive refractive power; a fourth lens having a positive refractive power near the optical axis thereof; and a fifth lens having a negative refractive power near the optical axis thereof. An image side surface of the fifth lens is concave near the optical axis and has a region where a negative power of the region decreases toward a periphery of the fifth lens as compared with a negative power near the optical axis.

An imaging lens according the aspect of the invention has a five-lens configuration, and is configured so that the number of the lenses increases as compared with the existing imaging lens having a four-lens configuration and the configuration of the respective lenses is optimized With such a configuration, it is possible to obtain a lens system having high resolution performance for coping with an increase in the number of pixels.

Furthermore, by appropriately adopting and satisfying the following preferable configuration, it becomes easier to achieve an increase in performance.

In order to obtain higher resolution performance, it is preferable that an imaging lens according to the aspect of the invention satisfies at least one of the following conditional expressions.

$$0.8 < f/f1 < 1.5 \tag{1}$$

$$f1 < |f2| < f3 \tag{2}$$

$$vd2 < 35 \tag{3}$$

Here, f1 is the focal length of the first lens, f2 is a focal length of the second lens, f3 is a focal length of the third lens, and f is a focal length of the whole system. vd2 is an Abbe number of the second lens at the d-line.

Further, in an imaging lens according to the aspect of the invention, it is preferable that the object side surface of the first lens is convex toward the object side near the optical axis. In addition, it is also preferable that the image side surface of the fourth lens is convex toward the image side near the optical axis.

In an imaging lens according to the aspect of the invention, it is preferred that both surfaces in each of the first lens, the second lens, the third lens, the fourth lens, and the fifth lens is aspheric.

In particular, it is preferable that the image side surface of the fourth lens is aspheric so as to satisfy the following expression.

$$ha < 0.7 hmax \tag{4}$$

Here, an aspheric shape at a certain height h from the vertex of the lens surface is expressed by an aspheric surface expression, a first order differential value of the aspheric surface expression represents a slope of the lens surface at the height h, and a second order differential value thereof represents a displacement of the slope of the lens surface. In this case, a minimum height, at which the algebraic sign of the second order differential value is changed, from the optical axis is defined as ha. In addition, a height at a maximum effective radius is defined as hmax, and a height at 70 percent of the maximum effective radius is defined as 0.7hmax.

An imaging apparatus according to another aspect of the invention includes: an imaging lens according to the aspect of the invention; and an imaging device for outputting an imaging signal based on an optical image formed by the imaging lens.

A portable terminal device according to still another aspect of the invention includes: an imaging apparatus according to the other aspect of the invention; and a display unit that displays an image taken by the imaging apparatus.

In an imaging apparatus or a portable terminal device according to the other aspects of the invention, a high resolution imaging signal is obtained on the basis of a high resolution optical image formed by the imaging lens according to the aspect of the invention.

According to an aspect of the invention, an imaging lens has a lens configuration using a total of five elements, and the shapes of the respective lenses and the like are appropriately set so as to be optimized. With such a configuration, it is possible to obtain high resolution performance.

Further, according to other aspects of the invention, an imaging apparatus or a portable terminal device is configured to output the imaging signal based on the optical image formed by the imaging lens having high resolution performance according to the aspect of the invention. With such a configuration, it is possible to obtain a high resolution photographing image.

BRIEF DESCRIPTION OF THE DRAWINGS

The features of the invention will appear more fully upon consideration of the exemplary embodiment of the invention, which are schematically set forth in the drawings, in which:

FIG. 1 is a sectional diagram illustrating a first exemplary configuration of an imaging lens according to an exemplary embodiment of the invention, corresponding to Example 1;

FIG. 2 is a sectional diagram illustrating a second exemplary configuration of the imaging lens, corresponding to Example 2;

FIG. 3 is a sectional diagram illustrating a third exemplary configuration of the imaging lens, corresponding to Example 3;

FIG. 4 is a sectional diagram illustrating a fourth exemplary configuration of the imaging lens, corresponding to Example 4;

FIG. 5 is a sectional diagram illustrating a fifth exemplary configuration of the imaging lens, corresponding to Example 5;

FIG. 6 is a sectional diagram illustrating a sixth exemplary configuration of the imaging lens, corresponding to Example 6;

FIG. 7 is a characteristic diagram illustrating differential values of an expression that represents an aspheric shape of an image side surface of a fourth lens in the imaging lens according to Example 1;

FIG. 12 is a characteristic diagram illustrating differential values of an expression that represents an aspheric shape of an image side surface of a fourth lens in the imaging lens according to Example 6;

FIG. 13A shows spherical aberration, FIG. 13B shows astigmatism, and FIG. 13C shows distortion;

FIGS. 14A to 14C are aberration diagrams illustrating aberrations of the imaging lens according to Example 2, where FIG. 14A shows spherical aberration, FIG. 14B shows astigmatism, and FIG. 14C shows distortion;

FIG. 15A shows spherical aberration, FIG. 15B shows astigmatism, and FIG. 15C shows distortion;

FIG. 16A shows spherical aberration, FIG. 16B shows astigmatism, and FIG. 16C shows distortion;

FIGS. 17A to 17C are aberration diagrams illustrating aberrations of the imaging lens according to Example 5, where FIG. 17A shows spherical aberration, FIG. 17B shows astigmatism, and FIG. 17C shows distortion;

FIGS. 18A to 18C are aberration diagrams illustrating aberrations of the imaging lens according to Example 6, where FIG. 18A shows spherical aberration, FIG. 18B shows astigmatism, and FIG. 18C shows distortion;

DETAILED DESCRIPTION OF THE EXEMPLARY EMBODIMENTS

Hereinafter, exemplary embodiments of the invention will be described in detail with reference to drawings.

FIG. 1 shows a first exemplary configuration of an imaging lens according to an exemplary embodiment of the invention. The exemplary configuration corresponds to a lens configuration of a first numerical example to be described later. Likewise, FIGS. 2 to 6 show sectional views of second to sixth exemplary configurations corresponding to lens configurations of second to sixth numerical examples to be described later. In FIGS. 1 to 6, the reference sign Ri represents a radius of curvature of i-th surface, where the number i is the sequential number that sequentially increases as it gets closer to an image side (an imaging side) when a surface of a lens element closest to an object side among the elements including the aperture diaphragm St is regarded as a first surface. The reference sign Di represents an on-axis surface spacing between i-th surface and (i+1)th surface on an optical axis Z1. In addition, since the respective exemplary configurations are basically similar in configuration, the following description will be given on the basis of the first exemplary configuration shown in FIG. 1

Figure 20A:
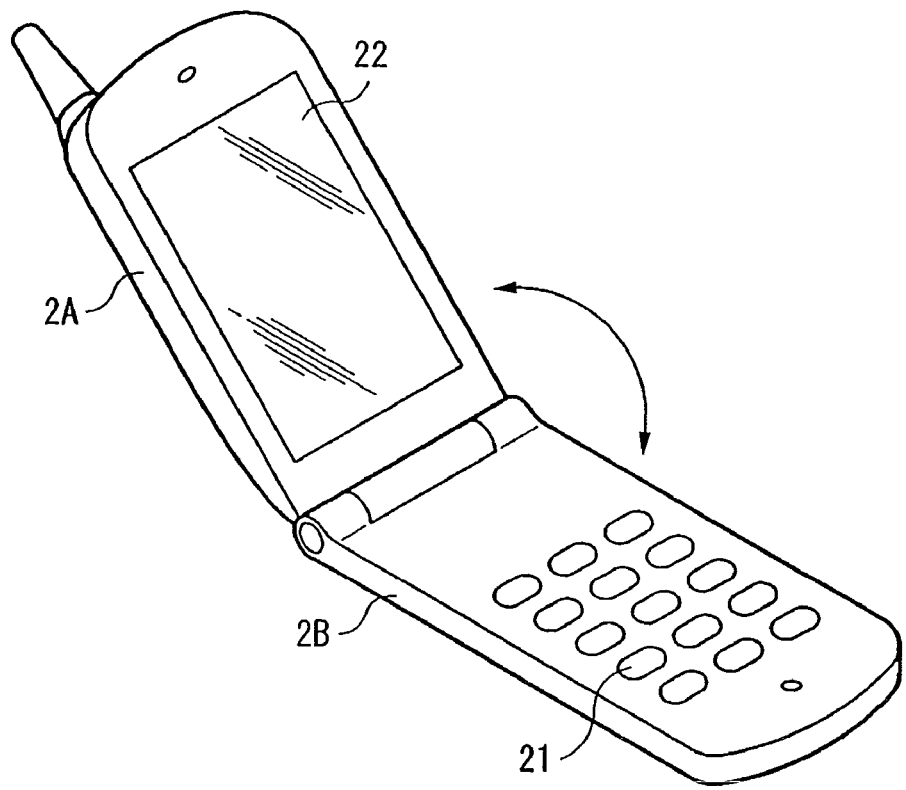
FIGS. 20A and 20B are exterior views illustrating an exemplary configuration of a cellular phone equipped with a camera as a portable terminal device according to an exemplary embodiment of the invention.
Figure 20B:
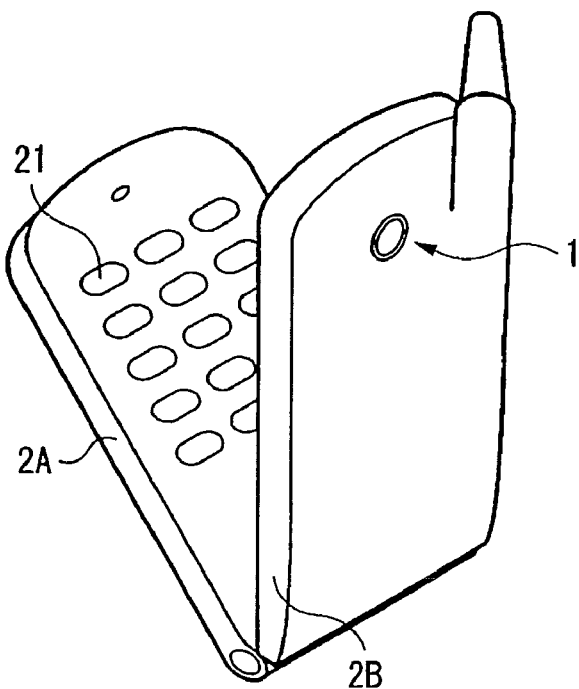
Figure 21:
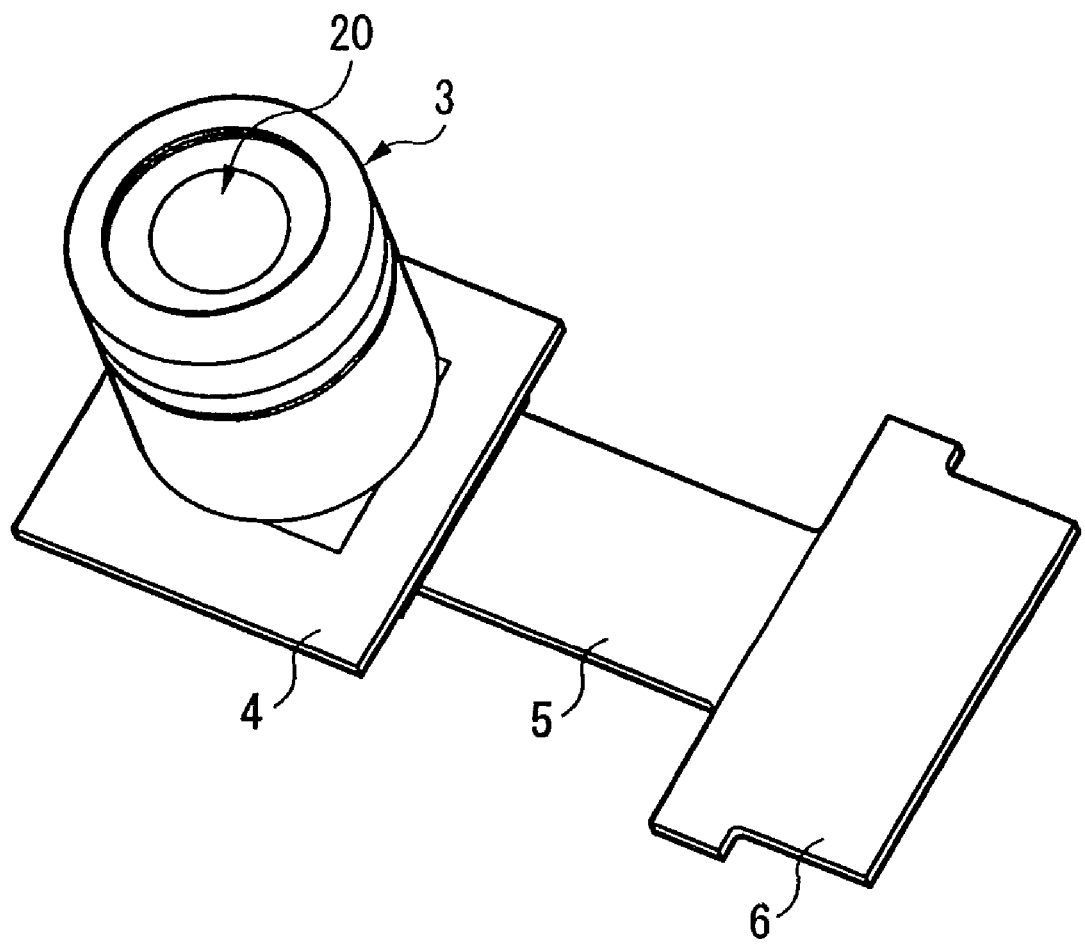
FIG. 21 is a perspective view illustrating an exemplary configuration of a camera module as an imaging apparatus according to an exemplary embodiment of the invention.

FIGS. 20A and 20B show a cellular phone equipped with a camera, as an exemplary embodiment of a portable terminal device. Further, FIG. 21 shows an exemplary configuration of a camera module as an exemplary embodiment of an imaging apparatus. As shown in FIGS. 20A and 20B, the cellular phone equipped with a camera has an upper casing 2A and a lower casing 2B, and both of the casings are configured to be able to freely rotate in an arrow direction shown in FIG. 20A. In the lower casing 2B, an operation key 21 and the like are disposed. In the upper casing 2A, a camera section 1 (shown in FIG. 20B) and a display section (display unit) 22 (FIG. 20A) are disposed. The display section 22 is formed of a display panel such as a LCD (Liquid Crystal Display) or an EL (Electro-Luminescence) panel. The display section 22 is disposed on an inner surface in a state where the cellular phone is folded. The display section 22 is able to display not only various menus for a telecommunication function but also images taken by the camera section 1. The camera section 1 is disposed on, for example, the rear side of the upper casing 2A. However, a location on which the camera section 1 is disposed is not limited to this.

The camera section 1 has, for example, the camera module as shown in FIG. 21. As shown in FIG. 21, the camera module includes a barrel 3 in which an imaging lens 20 is placed, a supporting substrate 4 which supports the barrel 3, and the imaging device (not shown in the drawing) which is disposed on a location corresponding to the imaging plane of the imaging lens 20 on the supporting substrate 4. The camera module further includes a flexible substrate 5 which is electrically connected to the imaging device on the supporting substrate 4, and a external connection terminal 6 which is configured to be connected to the flexible substrate 5 and be able to be connected to a signal processing circuit of a main body in cellular phones. These components are integrally formed.

In the camera section 1, an optical image formed by the imaging lens 20 is converted into an electric imaging signal by the imaging device, and the imaging signal is output to a signal processing circuit of the apparatus main body side. In such a cellular phone equipped with a camera, a high-resolution imaging signal in which aberration is sufficiently corrected is obtained by using an imaging lens according to the embodiment as the imaging lens 20. In the main body of the cellular phone, a high resolution image can be obtained on the basis of the imaging signal.

Furthermore, the imaging lens according to the embodiment can be applied to various imaging apparatuses using an imaging device such as CCD or CMOS or portable terminal devices. The imaging apparatus or portable terminal device according to the embodiment is not limited to the cellular phone equipped with a camera, and may be, for example, a digital camera, a PDA, or the like. Further, the imaging lens according to the embodiment is appropriately applicable to, in particular, an imaging apparatus or a portable terminal device equipped with the small-size and high-pixel imaging device having a pixel number of 2 mega or more and having a pixel pitch of 3 μm or less.

The imaging lens includes, along the optical axis Z1 in order from the object side, a first lens G1, a second lens G2, a third lens G3, a fourth lens G4, and a fifth lens G5. An optical aperture diaphragm St is disposed ahead of the first lens G1. More specifically, the aperture diaphragm St is disposed closer to the object side than the image side surface of the first lens G1 on the optical axis Z1.

In the imaging plane (the imaging surface) Simg of this imaging lens, an imaging device such as a CCD is arranged. Between the fifth lens G5 and the imaging device, various optical members CG may be disposed in accordance with a configuration of the camera side equipped with the lens system. For example, flat-plate-shaped optical members such as an infrared cut filter and a cover glass for protecting the imaging surface may be disposed. In this case, as the optical members GC, for example, members formed by applying a coat functioning as the infrared cut filter, an ND filter, or the like to a flat-plate-shaped cover glass may be used. Further, in the imaging lens, the coat functioning as the infrared cut filter, the ND filter, or the like or an antireflective coat may be applied to all of the first lens G1 to the fifth lens G5 or at least one lens surface.

The first lens G1 has a positive refractive power. The first lens G1 may be formed as a positive lens whose object side surface is convex toward the object side near the optical axis, for example, a biconvex lens near the optical axis. However, similar to the sixth exemplary configuration in FIG. 6, the first lens G1 may be a positive meniscus lens.

The second lens G2 has a negative refractive power. The second lens G2 may be formed as a negative lens, for example, a negative lens concave toward the object side near the optical axis. However, similar to the sixth exemplary configuration in FIG. 6, the second lens G2 may be formed as a negative lens concave toward the image side near the optical axis.

The third lens G3 is formed as a positive lens whose image side surface is convex near the optical axis, for example, a biconvex lens near the optical axis. However, similar to the sixth exemplary configuration in FIG. 6, the third lens G3 may be a positive meniscus lens convex toward the image side.

The fourth lens G4 has a positive refractive power near the optical axis. For example, the fourth lens G4 may be configured so that the image side surface thereof is convex toward the image side near the optical axis.

The fifth lens G5 has a negative refractive power near the optical axis. For example, the fifth lens G5 may be configured so that the image side surface is concave toward the image side near the optical axis.

It is preferable that the imaging lens is configured to satisfy the following conditional expressions. Here, f1 is defined as a focal length of the first lens G1, f2 is defined as a focal length of the second lens G2, f3 is defined as a focal length of the third lens G3, and f is defined as a focal length of the whole system. In addition, vd2 is defined as an Abbe number of the second lens G2 at the d-line.

$$0.8 < f/f1 < 1.5 \qquad (1)$$

$$f1 < |f2| < f3 \qquad (2)$$

$$vd2 < 35 \qquad (3)$$

In the imaging lens, it is preferable that both surfaces of each of the first lens G1, the second lens G2, the third lens G3, the fourth lens G4, and the fifth lens G5 is aspheric. In particular, it is preferable that the fourth lens G4 and the fifth lens G5 has aspheric shapes in which the tendency of the concave/convex profile of the lens is different between a portion of the lens near the optical axis and the peripheral portion thereof. For example, it is preferable that the image side surface of the fifth lens G5 is concave near the optical axis and has a region in which, as the periphery gets closer, a negative refractive power of the lens decreases as compared with that near the optical axis. Specifically, for example, it is preferable that the image side surface of the fifth lens G5 is formed as an aspheric surface which has a concave shape near the optical axis and has a convex shape in the peripheral portion.

Further, it is preferable that the image side surface of the fourth lens G4 is aspheric so as to satisfy the following expression.

$$ha < 0.7hmax \qquad (4)$$

Here, an aspheric shape at a certain height h from the vertex of the lens surface is expressed by an aspheric surface expression, a first order differential value of the aspheric surface expression represents a slope of the lens surface at the height h, and a second order differential value thereof represents a displacement of the slope of the lens surface. In this case, a minimum height, at which the algebraic sign of the second order differential value is changed, from the optical axis is defined as ha. In addition, a height at a maximum effective radius is defined as hmax, and a height at 70 percent of the maximum effective radius is defined as 0.7hmax.

Generally, the aspheric surface expression is represented by the following Expression (A):

$$Z = C \cdot h^2 / \{1 + (1 - K' \cdot C^2 \cdot h^2)^{1/2}\} + \Sigma A_i \cdot h^i \quad (A),$$

where
$K' = 1 + K$
K is an eccentricity,
Z is the depth (mm) of an aspheric surface,
h is the distance (a height, mm) from the optical axis to the lens surface,
C is a paraxial curvature equal to 1/R (R: a paraxial radius of curvature), and
$\Sigma A_i \cdot h^i$ is the sum of $A_i \cdot h^i$ when i=1 to n (n=an integer of 3 or more)
$A_i$ is an i-th order aspheric surface coefficient.

The Z represents a length (mm) of a perpendicular line dropped from a point, which exists on an aspheric surface at the height h from the optical axis, to a tangent plane (a plane perpendicular to the optical axis) to the vertex of the aspheric surface. That is, the Z represents a sag amount (a depth) of the aspheric surface based on a position of the vertex of the surface at the height h from the optical axis.

Figure 19:
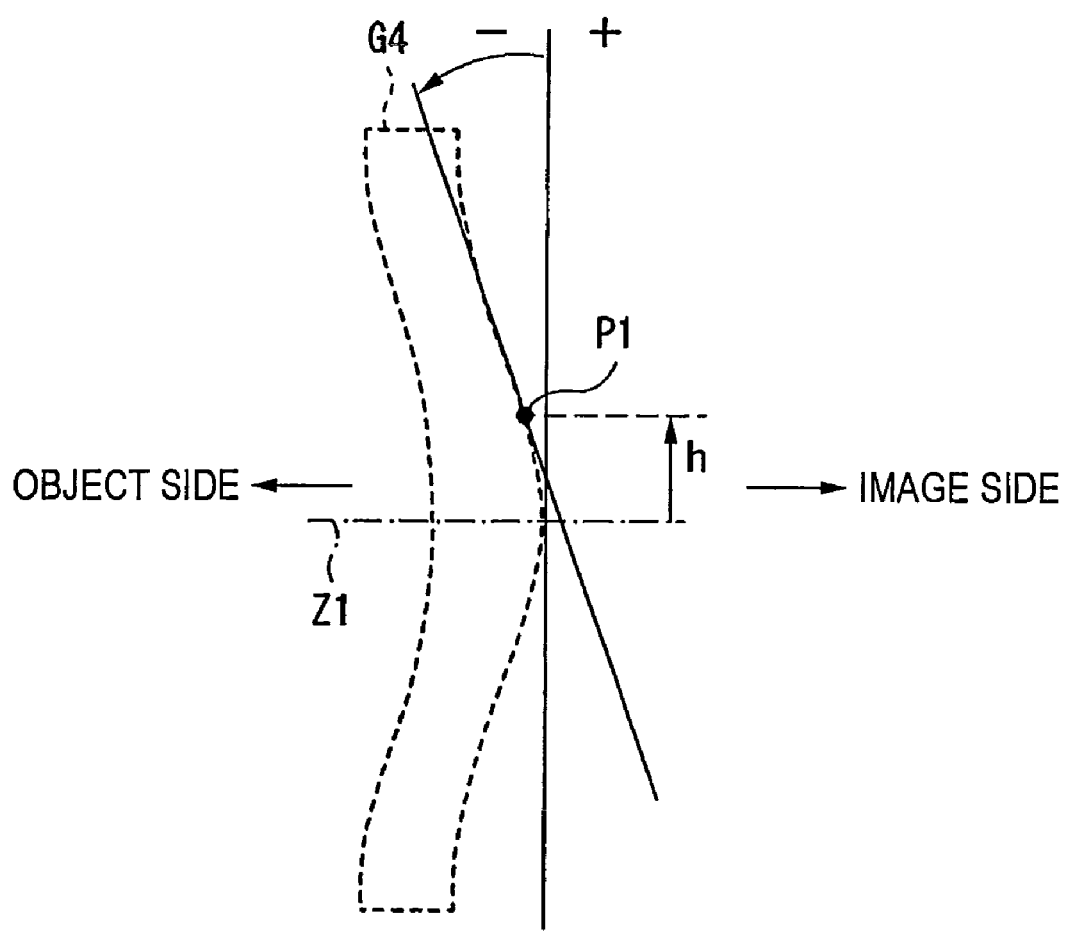
FIG. 19 is an explanatory diagram of an aspheric shape.

FIG. 19 shows a slope of the image side surface of the fourth lens G4. FIG. 19 shows the plane tangent to the lens surface position P1 at the certain height h from the vertex of the surface. The slope of the tangent plane corresponds to the slope of the lens surface at the height h. It is assumed that the algebraic sign of the slope is negative when the tangent plane is tilted toward the object side and, in contrast, the algebraic sign of the slope is positive when the tangent plane is tilted toward to the image side. The first order differential value of the aspheric surface expression represents the slope of the tangent plane at the height h as shown in FIG. 19.

Effect and Advantage

Next, operations and effects of the imaging lens configured as described above will be described. The imaging lens has a five-element lens configuration, and is configured so that the number of the lenses increases as compared with the existing imaging lens having a four-element configuration and the configuration of the respective lenses is optimized. With such a configuration, it is possible to obtain a lens system having high resolution performance for coping with an increase in the number of pixels. In particular, the image side surface of the third lens G3 is formed in a convex shape, and thus this makes it easier to achieve a fast optical system.

Conditional Expression (1) relates to the refractive power of the first lens G1. In the imaging lens, the first lens G1 has a main imaging function so as to satisfy Conditional Expression (1), thereby obtaining an optical system of which the entire length is short. When the result value of Conditional Expression (1) is less than the lower limit, the entire length thereof increases. When the result value is more than the upper limit, it is advantageous in the reduction of the entire length, but an image field curvature is increased, and thus it becomes difficult to obtain high resolution performance.

In order to decrease the entire length and increase resolution performance, it is preferable that the numerical value range of Conditional Expression (1) is the numerical value range of the following Conditional Expression (1A).

$$1.0 < f/f1 < 1.4 \quad (1A)$$

It is more preferable to satisfy the numerical value range of the following Conditional Expression (1B).

$$1.1 < f/f1 < 1.31 \quad (1B)$$

Furthermore, it is preferable to satisfy the numerical range of the following conditional expression (1C).

$$1.13 \leq f/f1 < 1.3 \quad (1C)$$

Conditional Expression (2) represents the appropriate relationship of the focal lengths of the first lens G1, the second lens G2, and the third lens G3. Conditional Expression (3) relates to an appropriate Abbe number of the second lens G2. Satisfying Conditional Expression (2) and Conditional Expression (3) is advantageous in correction of chromatic aberration. In particular, when the result value of Conditional Expression (3) is more than the upper limit, it becomes insufficient to correct chromatic aberration.

In order to more satisfactorily correct chromatic aberration, it is preferable that the upper limit of Conditional Expression (3) satisfies the following Conditional Expression (3A).

$$vd2 < 25 \quad (3A)$$

Further, in the imaging lens, the fourth lens G4 and the fifth lens G5, which are disposed closer to the image side than the other lenses, have aspheric shapes in which the tendency of the concave/convex profile of the lens is different between a portion of the lens near the optical axis and the peripheral portion thereof. With such a configuration, it is possible to satisfactorily correct the image field curvature in the range from the center portion of the image plane to the peripheral portion thereof. In particular, the image side surface of the fifth lens G5 has a region in which, as the periphery gets closer, the negative refractive power thereof decreases as compared with that near the optical axis. Thus, it is possible to satisfactorily correct image field curvature, and it is also possible to obtain high resolution performance. Furthermore, the shape of the image side surface of the fourth lens G4 is formed to satisfy the above-mentioned Conditional Expression (4), thereby satisfactorily correcting the image field curvature. As a result, it is possible to obtain high resolution performance.

As described above, according to the embodiment of the invention, the imaging lens has a lens configuration using a total of five elements, and the shapes of the respective lenses and the like are appropriately set so as to satisfy the conditional expression. With such a configuration, it is possible to obtain high resolution performance. Further, according to the embodiment of the invention, the imaging apparatus or the portable terminal device is configured to output the imaging signal based on the optical image formed by the imaging lens having high resolution performance according to the aspect of the invention. With such a configuration, it is possible to obtain a high resolution photographing image.

EXAMPLES

Next, specific numerical examples of the imaging lens according to the embodiment will be described. In the following explanation, a plurality of numerical examples will be partially and collectively described.

Example 1

Tables 1 and 2 show specific lens data corresponding to the configuration of the imaging lens shown in FIG. 1. Particularly, Table 1 shows basic lens data, and Table 2 shows aspheric surface data. In the column of the surface number Si in the lens data shown in Table 1, the number i represents the sequential number of i-th surface (i=1 to 13) that sequentially increases as it gets closer to the image side when a surface of a component closest to the object side is regarded as a first surface in the imaging lens according to Example 1. In the column of the radius of curvature Ri, there are values (mm) of the radius of curvature of i-th surface from the object side to correspond to the reference sign Ri in FIG. 1. Likewise, in the column of the on-axis surface spacing Di, there are spaces (mm) on the optical axis between the i-th surface Si and the (i+1)th surface Si+1 on the optical axis from the object side. In the columns of Ndj and vdj, there are values of the refractive index and the Abbe number of the j-th optical component from the object side at the d-line (587.6 nm).

In the imaging lens according to Example 1, both surfaces of each of the first lens G1, the second lens G2, the third lens G3, the fourth lens G4, and the fifth lens G5 are aspheric. In the basic lens data shown in Table 1, the radiuses of curvature of these aspheric surfaces are represented as numerical values of the radius of curvature near the optical axis.

Table 2 shows aspheric surface data in the imaging lens according to Example 1. In the numerical values represented as the aspheric surface data, the reference sign "E" means that a numerical value following this is a "power exponent" having a base of 10 and that this numerical value having a base of 10 and expressed by an exponential function is multiplied by a numerical value before the "E". For example, it means that "1.0E-02" is "$1.0 \times 10^{-2}$".

As regards to the aspheric surface data of the imaging lens according to Example 1, there are respective coefficients $A_i$ and K used in an aspheric surface shape expression expressed by the above-mentioned Expression (A). The imaging lens according to Example 1 is represented by effectively using the aspheric surface coefficients of $A_i$ up to 10th-order. Furthermore, although omitted in the table, 1st-order and 2nd-order aspheric surface coefficients $A_1$ and $A_2$ are set to 0 (that is, $A_1=0$, $A_2=0$).

Further, FIG. 7 shows a differential value of the above-mentioned Conditional Expression (4). That is, the shape of the image side surface of the fourth lens G4 is represented by the first order differential value and the second order differential value of the aspheric surface expression. The horizontal axis represents an effective radius (%), and the vertical axis represents a differential value. Furthermore, the maximum effective radius is assumed to be 100%. As shown in FIG. 7, the algebraic sign of the second order differential value is changed in the range from the portion near the optical axis to the portion corresponding to 70 percent of the maximum effective radius. Consequently, a condition of Conditional Expression (4) is satisfied.

TABLE 1

Example 1•Basic Lens Data

| | Si (Surface Number) | Ri (Radius of Curvature) | Di (Surface Spacing) | Ndj (Refractive Index) | vdj (Abbe Number) |
|---|---|---|---|---|---|
| | 1 (Aperture Diaphragm) | — | −0.0500 | | |
| G1 | 2 | 5.7973 | 1.7156 | 1.68986 | 53.2 |
| | 3 | −14.4594 | 0.7077 | | |
| G2 | 4 | −3.7406 | 0.8002 | 1.63171 | 23.3 |
| | 5 | −16.6841 | 0.3857 | | |
| G3 | 6 | 10.3419 | 1.2207 | 1.68986 | 53.2 |
| | 7 | −27.1630 | 0.8193 | | |
| G4 | 8 | −6.2152 | 1.0000 | 1.53112 | 55.4 |
| | 9 | −2.1234 | 0.5524 | | |
| G5 | 10 | −54.6551 | 0.8387 | 1.53112 | 55.4 |
| | 11 | 2.2356 | 1.3210 | | |
| GC | 12 | ∞ | 0.3000 | 1.51825 | 64.1 |
| | 13 | ∞ | 0.5324 | | |

TABLE 2

Example 1•Aspheric Surface Data

| Surface Number | K | A3 | A4 | A5 | A6 |
|---|---|---|---|---|---|
| 2 | −6.6595458E−01 | −2.2264853E−03 | 2.8319839E−03 | −6.1240749E−03 | 2.6130697E−03 |
| 3 | 3.7887217E+01 | −1.7498816E−03 | −6.2854864E−03 | −5.1360710E−03 | 4.0298527E−04 |
| 4 | 2.0432223E−01 | −5.0995718E−03 | −2.9197145E−03 | −5.1601168E−03 | 6.6464993E−04 |
| 5 | −1.7407184E+01 | −1.1357757E−02 | 3.6259629E−03 | −4.7234477E−03 | 1.5153221E−03 |
| 6 | −2.2162781E+01 | −1.9488057E−02 | 6.8200501E−03 | −3.4094379E−03 | 1.3498790E−03 |
| 7 | 4.0754712E+00 | −1.3391543E−02 | −2.0548138E−03 | −7.5340055E−06 | 1.0670443E−04 |
| 8 | 9.9941317E−01 | −1.3347593E−03 | −5.5966274E−04 | 4.5737346E−04 | 1.6692041E−04 |
| 9 | −6.1932945E+00 | −1.1494626E−03 | −1.8307142E−03 | 2.8959230E−03 | 1.4817073E−04 |
| 10 | 8.4280467E+01 | 4.1295935E−02 | −1.2434933E−02 | −2.7703551E−03 | 2.8354316E−04 |
| 11 | −8.2612420E+00 | 3.8203630E−02 | −2.4232133E−02 | 2.7620265E−03 | 9.5509224E−04 |

| | A7 | A8 | A9 | A10 |
|---|---|---|---|---|
| 2 | −1.6469939E−03 | 9.3010679E−04 | −2.8781472E−04 | −2.3793021E−05 |
| 3 | 1.2042691E−03 | −7.4547556E−04 | 1.5056348E−04 | 1.1180163E−05 |
| 4 | 3.7210511E−03 | −1.5710271E−03 | 4.4284301E−04 | −7.5176606E−05 |
| 5 | 3.2432168E−03 | −1.9431787E−03 | 4.4439591E−04 | −4.3615346E−05 |
| 6 | −1.5947226E−04 | −1.4702649E−04 | 8.7170747E−05 | −1.4857433E−05 |
| 7 | 2.1660380E−05 | 1.5181733E−05 | 1.1886248E−05 | −1.9522830E−06 |
| 8 | 2.5799322E−05 | −5.6538505E−06 | 5.8100792E−06 | −1.2681528E−06 |
| 9 | −4.2999839E−04 | 6.5633875E−05 | 9.8589107E−06 | −2.1603558E−06 |

TABLE 2-continued

| Example 1•Aspheric Surface Data | | | | |
|---|---|---|---|---|
| 10 | 2.1229131E−04 | −1.1933375E−06 | −8.9814694E−06 | 7.9467524E−07 |
| 11 | −2.9985989E−04 | 9.9861186E−06 | 5.2614485E−06 | −5.3720629E−07 |

Numerical Examples 2 to 6

Similar to the imaging lens according to the above-mentioned Example 1, Tables 3 and 4 show specific lens data as Example 2, corresponding to the configuration of the imaging lens shown in FIG. 2. Likewise, Tables 5 and 6 show specific lens data corresponding to the configuration of the imaging lens according to Example 3 shown in FIG. 3. Likewise, Tables 7 and 8 show specific lens data corresponding to the configuration of the imaging lens according to Example 4 shown in FIG. 4. Likewise, Tables 9 and 10 show specific lens data corresponding to the configuration of the imaging lens according to Example 5 shown in FIG. 5. Likewise, Tables 11 and 12 show specific lens data corresponding to the configuration of the imaging lens according to Example 6 shown in FIG. 6.

Furthermore, all the lens surfaces of the imaging lenses according to Examples 2 to 6 are formed in an aspheric shape, similar to the imaging lens according to Example 1. FIGS. 8 to 12 show a differential value of the above-mentioned Conditional Expression (4) representing the imaging lens according to Examples 2 to 6. That is, the shape of the image side surface of the fourth lens G4 is represented by the first order differential value and the second order differential value of the aspheric surface expression. As shown in FIGS. 8 to 12, as regards to any of the imaging lenses according to Examples 2 to 6, the algebraic sign of the second order differential value is changed in the range from the portion near the optical axis to the portion corresponding to 70 percent of the maximum effective radius. Consequently, a condition of Conditional Expression (4) is satisfied.

TABLE 3

| | Example 2•Basic Lens Data | | | | |
|---|---|---|---|---|---|
| | Si (Surface Number) | Ri (Radius of Curvature) | Di (Surface Spacing) | Ndj (Refractive Index) | vdj (Abbe Number) |
| | 1 (Aperture Diaphragm) | — | −0.0500 | | |
| G1 | 2 | 6.5447 | 1.9310 | 1.68986 | 53.2 |
| | 3 | −10.9762 | 0.4724 | | |
| G2 | 4 | −7.5121 | 0.8000 | 1.63171 | 23.3 |
| | 5 | 30.1954 | 0.7396 | | |
| G3 | 6 | 27.7459 | 1.0000 | 1.53112 | 55.4 |
| | 7 | −18.0682 | 0.5182 | | |
| G4 | 8 | −9.7642 | 1.7004 | 1.68986 | 53.2 |
| | 9 | −2.5256 | 0.5897 | | |
| G5 | 10 | ∞ | 0.8000 | 1.53112 | 55.4 |
| | 11 | 1.9849 | 1.3210 | | |
| GC | 12 | ∞ | 0.3000 | 1.51825 | 64.1 |
| | 13 | ∞ | 0.5976 | | |

TABLE 4

| | Example 2•Aspheric Surface Data | | | | |
|---|---|---|---|---|---|
| Surface Number | Coefficient | | | | |
| | K | A3 | A4 | A5 | A6 |
| 2 | 5.8780432E−01 | −2.7118183E−03 | 2.5979235E−03 | −6.3494857E−03 | 3.5326848E−03 |
| 3 | 1.9702390E+01 | −2.6581151E−03 | −6.2675266E−03 | −4.2788057E−03 | 3.5605853E−04 |
| 4 | 3.3035963E+00 | −5.7308466E−03 | −8.5283106E−03 | −7.1561330E−03 | 2.9481937E−04 |
| 5 | −4.4254455E+00 | −2.9998206E−03 | 7.2369756E−04 | −6.5236737E−03 | 9.8407919E−04 |
| 6 | −5.0594052E+01 | −7.0452045E−03 | 5.8836477E−03 | −3.9153624E−03 | 1.2061858E−03 |
| 7 | 0.0000000E+00 | −4.3632834E−03 | 4.5489121E−04 | 3.2509461E−04 | 1.2989725E−04 |
| 8 | 0.0000000E+00 | 4.3424112E−03 | 1.6843587E−04 | −2.2277021E−06 | 6.2163220E−05 |
| 9 | −7.6838274E+00 | −5.1876084E−03 | −4.9757517E−03 | 2.9153409E−03 | 1.5385035E−04 |
| 10 | 0.0000000E+00 | 2.8236998E−02 | −1.0829776E−02 | −2.6280452E−03 | 2.9080321E−04 |
| 11 | −6.9733958E+00 | 4.7675235E−02 | −2.9010030E−02 | 3.2327096E−03 | 1.1096738E−03 |

| | A7 | A8 | A9 | A10 |
|---|---|---|---|---|
| 2 | −1.8652258E−03 | 8.5324457E−04 | −3.0611277E−04 | 8.1211038E−06 |
| 3 | 1.1874792E−03 | −6.1169228E−04 | 1.1271132E−04 | 7.4468775E−06 |
| 4 | 3.5510619E−03 | −1.4644409E−03 | 4.4035702E−04 | −7.2332348E−05 |
| 5 | 3.1265569E−03 | −1.8733883E−03 | 4.5106626E−04 | −4.2148168E−05 |
| 6 | −2.0471771E−04 | −1.9030461E−04 | 1.0243095E−04 | −1.6615805E−05 |
| 7 | 1.8455905E−05 | −1.5034842E−06 | −1.2444847E−06 | 1.5732400E−07 |
| 8 | 1.4802409E−05 | 7.7654697E−06 | 3.7530227E−07 | −8.6561802E−07 |
| 9 | −4.0908065E−04 | 6.7680445E−05 | 1.0989294E−05 | −2.4560007E−06 |
| 10 | 2.1115184E−04 | −8.5006899E−07 | −9.1213797E−06 | 7.9777418E−07 |
| 11 | −3.1084545E−04 | 5.8985120E−06 | 5.0104532E−06 | −4.1591394E−07 |

TABLE 5

Example 3•Basic Lens Data

|  | Si (Surface Number) | Ri (Radius of Curvature) | Di (Surface Spacing) | Ndj (Refractive Index) | vdj (Abbe Number) |
|---|---|---|---|---|---|
|  | 1 (Aperture Diaphragm) | — | −0.0500 |  |  |
| G1 | 2 | 6.7570 | 1.9785 | 1.68986 | 53.2 |
|  | 3 | −10.7893 | 0.4465 |  |  |
| G2 | 4 | −8.2675 | 0.8000 | 1.63171 | 23.3 |
|  | 5 | 24.9082 | 0.7638 |  |  |
| G3 | 6 | 25.5863 | 0.8360 | 1.53112 | 55.4 |
|  | 7 | −30.7424 | 0.5566 |  |  |
| G4 | 8 | −11.8099 | 1.8682 | 1.68986 | 53.2 |
|  | 9 | −2.4786 | 0.5401 |  |  |
| G5 | 10 | ∞ | 0.7982 | 1.53112 | 55.4 |
|  | 11 | 1.9571 | 1.3210 |  |  |
| GC | 12 | ∞ | 0.3000 | 1.51825 | 64.1 |
|  | 13 | ∞ | 0.6785 |  |  |

TABLE 6

Example 3•Aspheric Surface Data

| Surface Number | K | A3 | A4 | A5 | A6 |
|---|---|---|---|---|---|
| 2 | 7.0162326E−02 | −2.1567356E−03 | 2.3914325E−03 | −6.2797333E−03 | 3.8424433E−03 |
| 3 | 1.8608326E+01 | −2.5482118E−03 | −6.1227450E−03 | −4.2966936E−03 | 4.0721834E−04 |
| 4 | 3.3304911E+00 | −6.3478690E−03 | −8.5926621E−03 | −7.3000913E−03 | 2.3610590E−04 |
| 5 | −2.3410360E+00 | −3.3700731E−03 | 3.9224496E−04 | −6.6808617E−03 | 9.4170013E−04 |
| 6 | −5.6828275E+01 | −6.7018594E−03 | 5.7783859E−03 | −3.8878742E−03 | 1.2139526E−03 |
| 7 | 0.0000000E+00 | −2.6884147E−03 | −4.0404842E−04 | 2.9193013E−04 | 1.2493254E−04 |
| 8 | 0.0000000E+00 | 3.7649011E−03 | 1.5652677E−04 | −1.5515569E−05 | 5.3673148E−05 |
| 9 | −7.5068547E+00 | −5.9747441E−03 | −5.2169223E−03 | 2.9014468E−03 | 1.4910474E−04 |
| 10 | 0.0000000E+00 | 2.8088606E−02 | −1.0822570E−02 | −2.6325782E−03 | 2.9019901E−04 |
| 11 | −6.8644568E+00 | 4.7554052E−02 | −2.9134685E−02 | 3.2701549E−03 | 1.1065150E−03 |

|  | A7 | A8 | A9 | A10 |
|---|---|---|---|---|
| 2 | −1.9622419E−03 | 8.2343220E−04 | −2.8326026E−04 | 9.9006519E−06 |
| 3 | 1.2322721E−03 | −6.2280466E−04 | 1.0698721E−04 | 7.7268256E−06 |
| 4 | 3.4897907E−03 | −1.4854570E−03 | 4.3578105E−04 | −6.7254807E−05 |
| 5 | 3.1165089E−03 | −1.8751176E−03 | 4.5118868E−04 | −4.2187874E−05 |
| 6 | −2.0199375E−03 | −1.9191572E−04 | 1.0278010E−04 | −1.6270653E−05 |
| 7 | 1.8831378E−05 | −1.3813199E−06 | −1.1119578E−06 | 1.7860122E−07 |
| 8 | 1.3338879E−05 | 6.8274432E−06 | 5.7921133E−07 | −8.1664260E−07 |
| 9 | −4.0780272E−04 | 6.8821780E−05 | 1.1014259E−05 | −2.4893274E−06 |
| 10 | 2.1136652E−04 | −8.6727896E−07 | −9.1175044E−06 | 7.9868111E−07 |
| 11 | −3.1070817E−04 | 5.8493782E−06 | 4.9932618E−06 | −4.1204691E−07 |

TABLE 7

Example 4•Basic Lens Data

|  | Si (面番号) | Ri (曲率半径) | Di (面間隔) | Ndj (屈折率) | vdj (アッベ数) |
|---|---|---|---|---|---|
|  | 1 (Aperture Diaphragm) | — | −0.1000 |  |  |
| G1 | 2 | 5.2014 | 1.4819 | 1.75002 | 45.0 |
|  | 3 | −18.5740 | 0.5024 |  |  |
| G2 | 4 | −3.3332 | 0.7939 | 1.63171 | 23.3 |
|  | 5 | −17.4830 | 0.2002 |  |  |
| G3 | 6 | 7.2275 | 1.0799 | 1.68986 | 53.2 |
|  | 7 | −47.2756 | 1.1898 |  |  |
| G4 | 8 | −14.0609 | 1.0000 | 1.53112 | 55.4 |
|  | 9 | −2.0013 | 0.3188 |  |  |
|  | 10 | −7.0307 | 0.7000 | 1.53112 | 55.4 |

TABLE 7-continued

Example 4·Basic Lens Data

| | | Si (面番号) | Ri (曲率半径) | Di (面間隔) | Ndj (屈折率) | νdj (アッベ数) |
|---|---|---|---|---|---|---|
| G5 | { | 11 | 2.1946 | 1.0000 | | |
| GC | { | 12 | ∞ | 0.3000 | 1.51825 | 64.1 |
|    |   | 13 | ∞ | 0.5808 | | |

TABLE 8

Example 4·Aspheric Surface Data

| Surface Number | Coefficient | | | | |
|---|---|---|---|---|---|
| | K | A3 | A4 | A5 | A6 |
| 2 | −3.6292124E−01 | −2.6978399E−03 | 1.4357619E−03 | −8.0258434E−03 | 8.3779753E−03 |
| 3 | 5.2881592E+01 | −3.8474514E−04 | −1.4227778E−02 | −9.0717246E−03 | 6.3832549E−04 |
| 4 | −7.4665554E−02 | −7.4885572E−03 | −2.8067576E−03 | −9.2949792E−03 | 5.9620464E−04 |
| 5 | 5.1619348E+01 | −2.2806765E−02 | 3.5662232E−03 | −1.1552909E−03 | 4.8858132E−03 |
| 6 | −4.0506656E+01 | −1.8787710E−02 | 5.9524608E−03 | −3.9496565E−03 | 1.7889201E−03 |
| 7 | −6.4891029E+01 | −3.9250357E−03 | −4.4875230E−03 | −1.2855461E−03 | 3.9489623E−05 |
| 8 | 5.5571164E+00 | −1.0487596E−02 | −1.4588363E−03 | 7.1771655E−04 | −1.3977736E−04 |
| 9 | −7.6119533E+00 | −1.8210350E−02 | 2.8116017E−03 | 3.6450444E−03 | −3.8846936E−05 |
| 10 | −2.3832433E−01 | 4.6658181E−02 | −1.1700356E−02 | −2.4936597E−03 | 3.5942932E−04 |
| 11 | −7.4371860E+00 | 4.9231964E−03 | −4.9856798E−03 | −1.9751487E−03 | 1.3871305E−03 |
| | A7 | A8 | A9 | A10 | |
| 2 | −7.4128740E−03 | 1.6379212E−03 | 7.3544973E−04 | −4.2376133E−04 | |
| 3 | 2.1817870E−03 | −1.6998685E−03 | 5.5850780E−04 | −1.1569319E−05 | |
| 4 | 7.2616472E−03 | −2.2089935E−03 | 3.0628466E−04 | −7.3702965E−05 | |
| 5 | 3.8909996E−03 | −2.4267077E−03 | 2.9752288E−04 | −1.3141953E−05 | |
| 6 | 7.2750009E−05 | −1.9860925E−04 | 3.8035736E−05 | −3.9299605E−06 | |
| 7 | −1.3759372E−04 | 5.0188260E−05 | 4.9451078E−05 | −1.2862486E−05 | |
| 8 | −1.5014896E−04 | 1.2622302E−06 | 2.0249368E−07 | 2.3018199E−06 | |
| 9 | −4.4449692E−04 | 6.3218282E−05 | 8.4162844E−06 | −1.6955235E−06 | |
| 10 | 2.2803055E−04 | −8.6845739E−06 | −1.0062001E−05 | 1.0236901E−06 | |
| 11 | −3.0554944E−04 | 2.6297291E−05 | −1.0755694E−07 | −9.6848522E−08 | |

TABLE 9

Example 5·Basic Lens Data

| | | Si (Surface Number) | Ri (Radius of Curvature) | Di (Surface Spacing) | Ndj (Refractive Index) | νdj (Abbe Number) |
|---|---|---|---|---|---|---|
| | | 1 (Aperture Diaphragm) | — | −0.1000 | | |
| G1 | { | 2 | 5.2414 | 1.1854 | 1.80348 | 39.4 |
|    |   | 3 | −19.5389 | 0.2016 | | |
| G2 | { | 4 | −4.4968 | 0.6500 | 1.63171 | 23.3 |
|    |   | 5 | 22.7088 | 0.2003 | | |
| G3 | { | 6 | 8.1218 | 0.9995 | 1.80348 | 39.4 |
|    |   | 7 | −25.2129 | 1.8652 | | |
| G4 | { | 8 | 64.6815 | 0.9212 | 1.53112 | 55.4 |
|    |   | 9 | −2.1970 | 0.2245 | | |
| G5 | { | 10 | −3.3142 | 0.7000 | 1.53112 | 55.4 |
|    |   | 11 | 2.7411 | 0.8000 | | |
| GC | { | 12 | ∞ | 0.3000 | 1.51825 | 64.1 |
|    |   | 13 | ∞ | 0.5610 | | |

TABLE 10

Example 5·Aspheric Surface Data

| Surface Number | Coefficient | | | | |
|---|---|---|---|---|---|
| | K | A3 | A4 | A5 | A6 |
| 2 | −4.7375209E+00 | −5.1081985E−04 | −9.3062300E−05 | −4.4706270E−03 | 5.1313803E−04 |
| 3 | −5.8523921E+00 | 1.0024440E−03 | −2.3174350E−02 | −9.3206118E−03 | 1.5700422E−03 |
| 4 | −3.8978803E+00 | −2.6041180E−03 | 2.7627002E−04 | −1.6996119E−02 | −3.4103097E−03 |

TABLE 10-continued

Example 5•Aspheric Surface Data

| | | | | | |
|---|---|---|---|---|---|
| 5 | −1.4288273E+00 | −7.5448843E−03 | 5.8476977E−03 | −1.1935351E−03 | 3.0458093E−03 |
| 6 | −4.4799398E+01 | −9.6308800E−03 | 2.6358442E−03 | −4.3082341E−03 | 2.7996095E−03 |
| 7 | −3.1285788E+01 | −1.8456790E−03 | −6.4364501E−03 | 1.2814040E−03 | 2.7627449E−04 |
| 8 | −2.2454258E+01 | 3.3971909E−03 | −1.0799442E−02 | 4.3654473E−04 | 1.6792562E−04 |
| 9 | −9.8834794E−00 | −3.8559561E−03 | −2.1291631E−03 | 3.2356809E−03 | 2.2968938E−04 |
| 10 | −2.1869733E+00 | 3.7382317E−02 | −3.0673152E−03 | −2.6152867E−03 | 1.6588641E−04 |
| 11 | −1.4536271E+01 | 3.9159709E−03 | −3.0718774E−03 | −1.2900535E−03 | 8.2833206E−04 |

| | A7 | A8 | A9 | A10 |
|---|---|---|---|---|
| 2 | 5.2395536E−03 | −7.8005109E−03 | 2.4231311E−03 | −1.4287066E−04 |
| 3 | −3.8925589E−03 | 2.9985580E−03 | −8.3172815E−04 | 2.4355795E−04 |
| 4 | 3.8092491E−03 | 2.7732626E−03 | −6.8161102E−04 | −5.1661315E−06 |
| 5 | 3.0583557E−03 | −2.0193742E−03 | 8.2950227E−05 | 5.0563963E−05 |
| 6 | 2.5056119E−04 | −4.0156094E−04 | 6.9964032E−05 | −4.3852104E−06 |
| 7 | 7.5357782E−05 | 5.4810851E−05 | 4.5752876E−06 | 4.2446918E−06 |
| 8 | −7.9911151E−05 | −3.3684365E−05 | 1.5009717E−05 | −1.2328561E−06 |
| 9 | −4.5660376E−04 | 6.0508229E−05 | 6.5201102E−06 | −1.2841542E−06 |
| 10 | 1.7857791E−04 | −4.3892503E−06 | −8.3645040E−06 | 8.7235586E−07 |
| 11 | 1.7845741E−04 | 1.1926842E−05 | 3.3722966E−07 | −4.2262934E−08 |

TABLE 11

Example 6•Basic Lens Data

| | Si (Surface Number) | Ri (Radius of Curvature) | Di (Surface Spacing) | Ndj (Refractive Index) | νdj (Abbe Number) |
|---|---|---|---|---|---|
| | 1 (Aperture Diaphragm) | — | −0.2000 | | |
| G1 | 2 | 4.2259 | 0.8204 | 1.68986 | 53.2 |
| | 3 | 29.7183 | 0.1001 | | |
| G2 | 4 | 8.4892 | 0.6250 | 1.63171 | 23.3 |
| | 5 | 4.1032 | 0.7074 | | |
| G3 | 6 | −37.0766 | 1.0185 | 1.53112 | 55.4 |
| | 7 | −7.5589 | 1.4624 | | |
| G4 | 8 | −5.3587 | 0.9999 | 1.53112 | 55.4 |
| | 9 | −2.3897 | 0.1000 | | |
| G5 | 10 | 11.6783 | 1.2646 | 1.50956 | 56.5 |
| | 11 | 2.1417 | 1.3210 | | |
| GC | 12 | ∞ | 0.3000 | 1.51825 | 64.1 |
| | 13 | ∞ | 0.9900 | | |

TABLE 12

Example 6•Aspheric Surface Data

| Surface Number | Coefficient | | | | |
|---|---|---|---|---|---|
| | K | A3 | A4 | A5 | A6 |
| 2 | 1.9355063E+00 | −1.4638152E−03 | −2.6753916E−03 | −6.5605247E−03 | 5.9691050E−03 |
| 3 | −3.3876358E+00 | 5.1752298E−03 | −6.0173224E−02 | 5.7894787E−02 | −2.8775420E−02 |
| 4 | −8.5954250E+01 | 1.5271496E−02 | −7.8238917E−02 | 8.3719232E−02 | −3.8935466E−02 |
| 5 | 1.2463556E+00 | 1.6495319E−02 | −5.2021082E−02 | 3.9559324E−02 | −1.1598472E−02 |
| 6 | 8.8101559E+01 | 3.9345874E−03 | −6.5370454E−03 | −8.6902543E−03 | 5.0100183E−03 |
| 7 | 2.6051033E+00 | 2.9657382E−03 | −6.5888219E−03 | −6.2049367E−04 | −9.3975444E−04 |
| 8 | −1.1726182E+01 | 5.5801522E−03 | 2.2937585E−03 | 4.1638689E−03 | −4.4916754E−03 |
| 9 | −7.3221452E+00 | −1.3562823E−02 | 3.8936807E−03 | 3.3828721E−03 | −5.8476192E−05 |
| 10 | −7.1361618E+01 | −3.1289571E−03 | −1.1515581E−02 | 1.5628509E−03 | −5.8825270E−05 |
| 11 | −7.2672012E−00 | 1.0391875E−03 | −2.1087213E−02 | 7.7679908E−03 | −1.0368268E−03 |

| | A7 | A8 | A9 | A10 |
|---|---|---|---|---|
| 2 | 1.8879118E−03 | −1.0096782E−02 | 7.8273709E−03 | −1.9579535E−03 |
| 3 | 2.0884570E−02 | −1.2293438E−02 | 2.0133565E−03 | 3.0596287E−04 |
| 4 | 2.7920965E−02 | −2.0345813E−02 | 5.3954392E−03 | −9.5406658E−05 |
| 5 | 6.6062602E−03 | −4.9943112E−03 | 6.3722658E−04 | 2.1034579E−04 |
| 6 | 4.8316928E−03 | −4.8804861E−03 | 2.1074579E−03 | −4.1184978E−04 |
| 7 | 1.5513755E−03 | −1.1088618E−03 | 5.7686846E−04 | −9.9499613E−05 |
| 8 | 7.7217221E−04 | 9.6971404E−05 | 2.9868551E−06 | −1.4981451E−05 |
| 9 | −4.1805252E−04 | 3.4292025E−05 | −3.9215868E−06 | 2.5950275E−06 |
| 10 | 2.2696844E−04 | −6.1701777E−05 | 5.7426333E−06 | −2.1281856E−07 |
| 11 | −2.7788901E−04 | 1.4598316E−04 | −2.4961197E−05 | 1.5599644E−06 |

Other Data of Examples

Table 13 shows values of the above-mentioned Conditional Expressions (1) to (3) collected in accordance with the respective examples. As can be seen from Table 13, values of the respective examples are set to be in the numerical value ranges of Conditional Expressions (1) to (3). Table 13 shows data representing F number (FNO.). As can be seen from Table 13, a value of the F number (FNO.) is small, and a fast lens system is embodied particularly in Examples 1 to 3.

TABLE 13

Values relating to Conditional Expressions

| Conditional Expression | Expression No. | Example 1 | 2 | 3 | 4 | 5 | 6 |
|---|---|---|---|---|---|---|---|
| FNO. | | 2.04 | 2.04 | 2.04 | 2.4 | 2.84 | 2.82 |
| f | | 7.51 | 7.50 | 7.50 | 6.84 | 6.66 | 7.99 |
| f1 | (2) | 6.21 | 6.22 | 6.31 | 5.57 | 5.26 | 7.05 |
| f2 | (2) | −7.82 | −9.45 | −9.74 | −6.66 | −5.89 | −13.31 |
| f3 | (2) | 11.00 | 20.76 | 26.43 | 9.16 | 7.75 | 17.67 |
| $0.8 < f/f1 < 1.5$ | (1) | 1.21 | 1.21 | 1.19 | 1.23 | 1.27 | 1.13 |
| $1.0 < f/f1 < 1.4$ | (1A) | 1.21 | 1.21 | 1.19 | 1.23 | 1.27 | 1.13 |
| $1.1 < f/f1 < 1.3$ | (1B) | 1.21 | 1.21 | 1.19 | 1.23 | 1.27 | 1.13 |
| vd2 < 35 | (3) | 23.3 | 23.3 | 23.3 | 23.3 | 23.3 | 23.3 |
| vd2 < 25 | (3A) | 23.3 | 23.3 | 23.3 | 23.3 | 23.3 | 23.3 |

Aberration Performances

Figure 8:
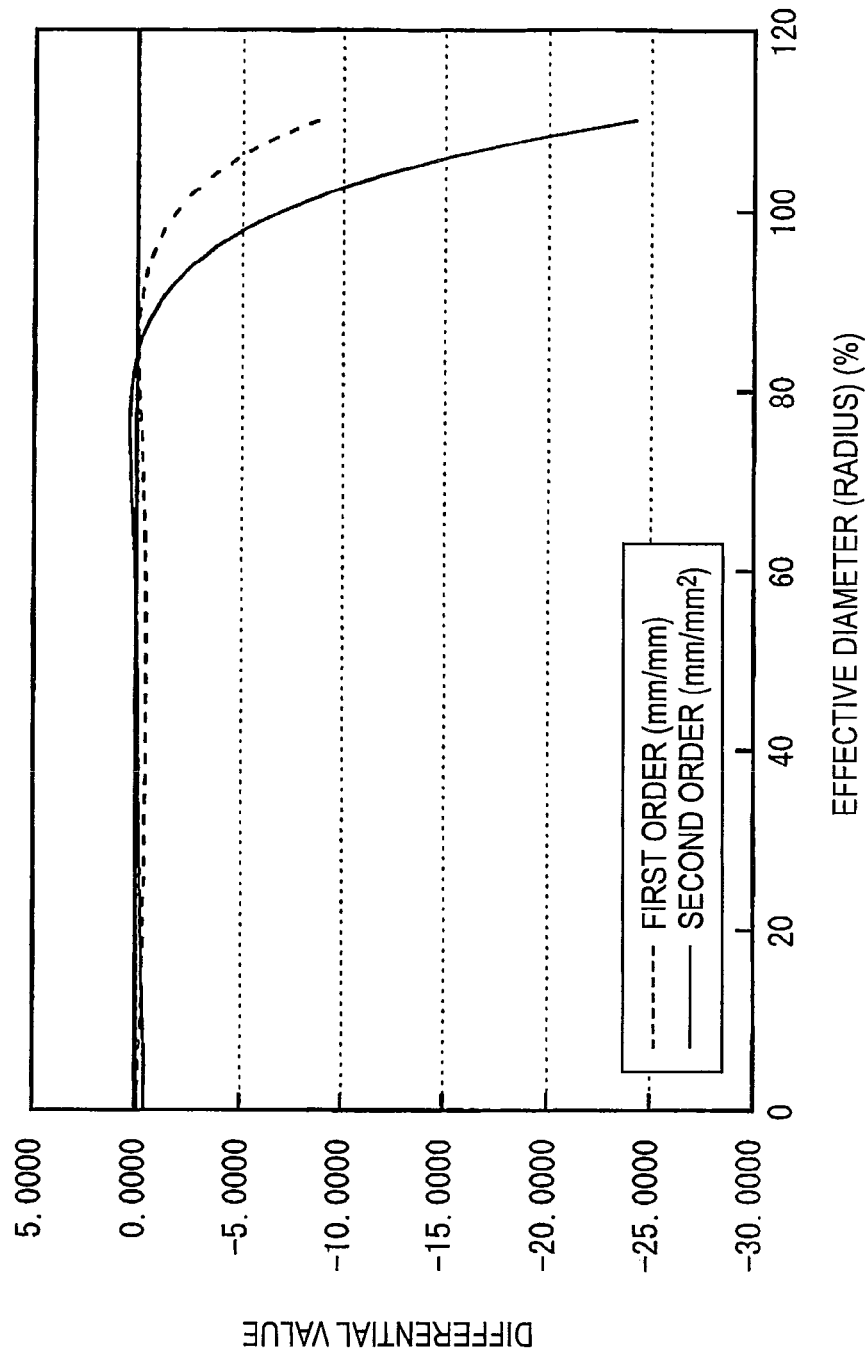
FIG. 8 is a characteristic diagram illustrating differential values of an expression that represents an aspheric shape of an image side surface of a fourth lens in the imaging lens according to Example 2.
Figure 9:
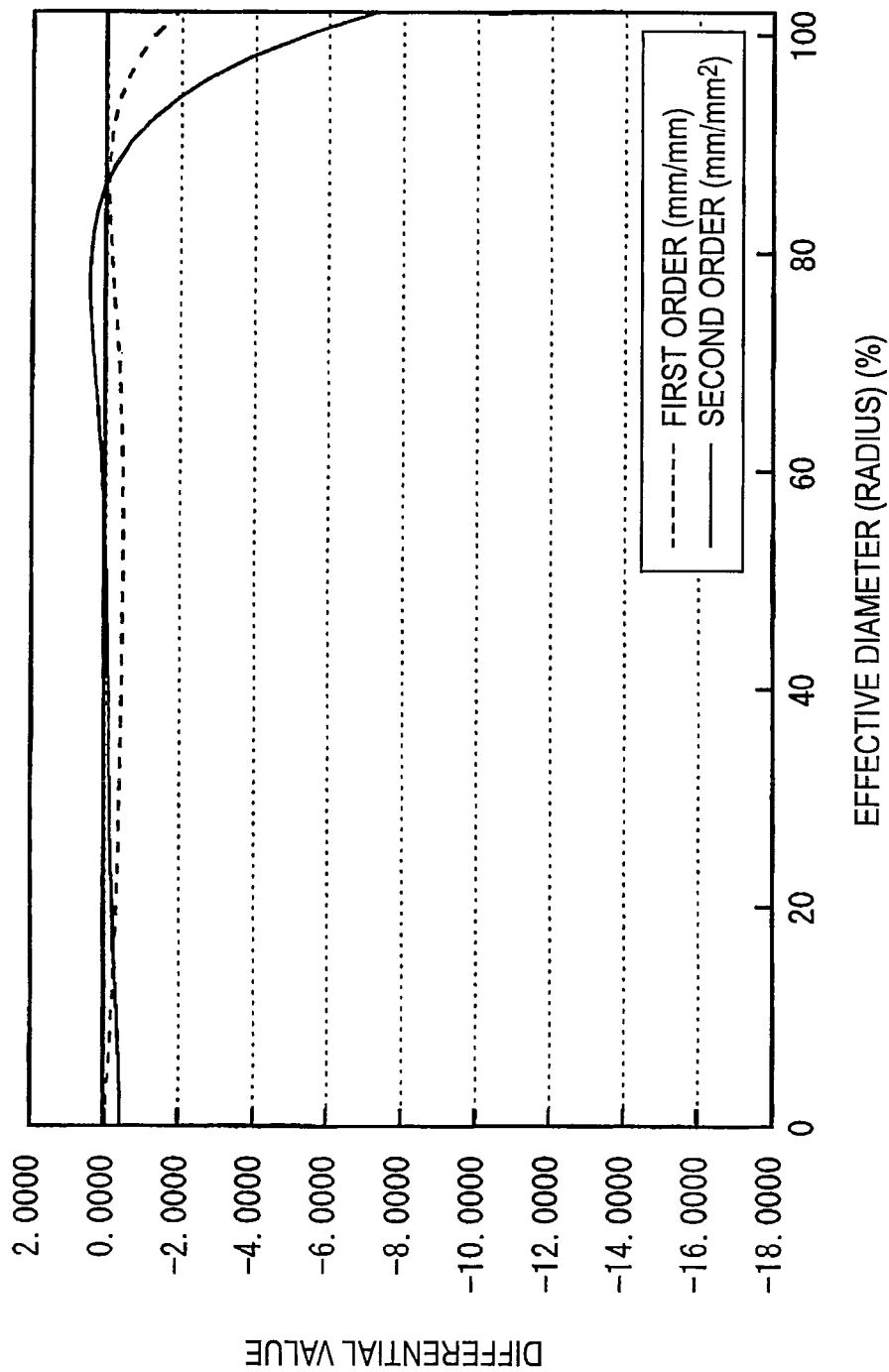
FIG. 9 is a characteristic diagram illustrating differential values of an expression that represents an aspheric shape of an image side surface of a fourth lens in the imaging lens according to Example 3.
Figure 10:
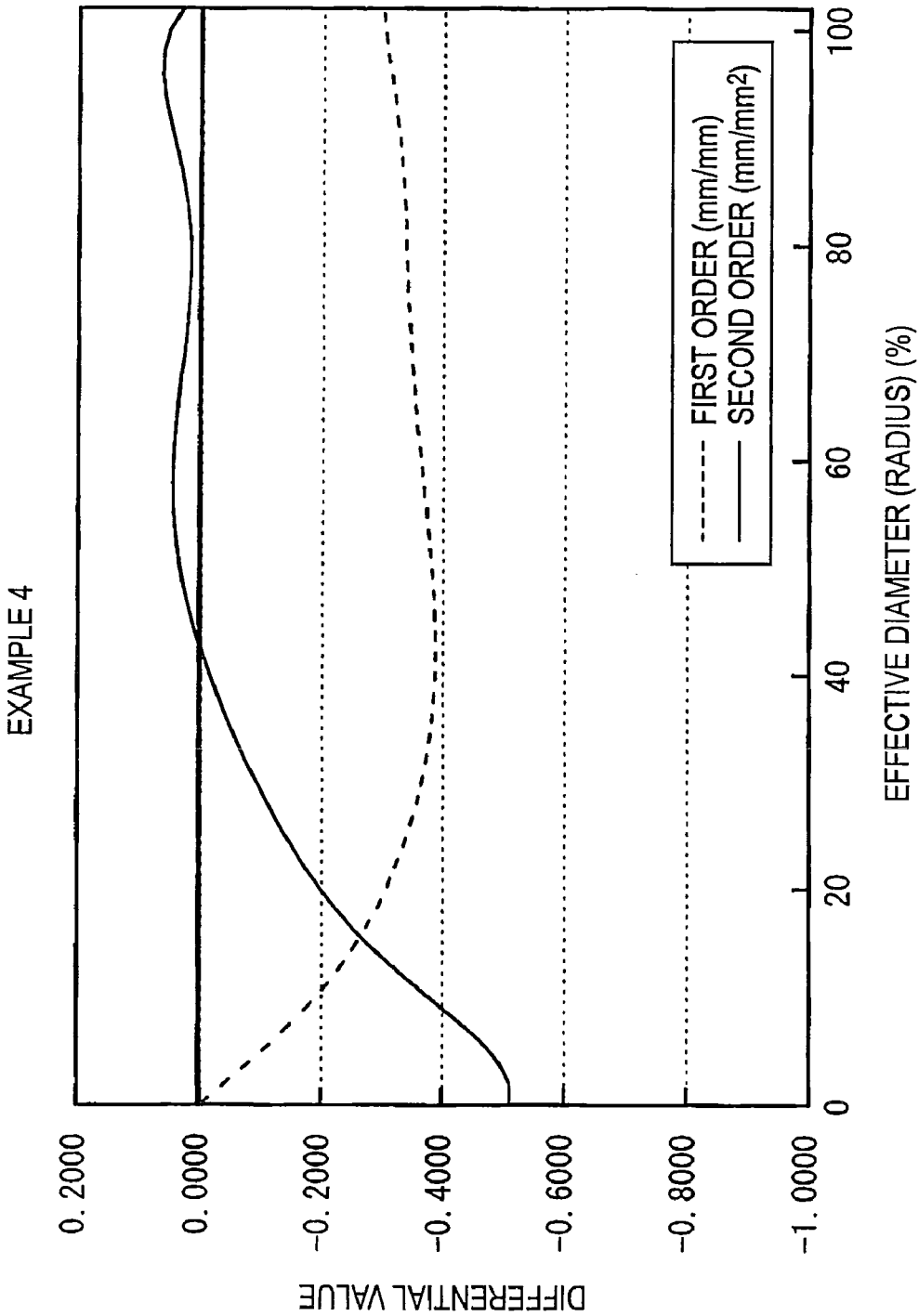
FIG. 10 is a characteristic diagram illustrating differential values of an expression that represents an aspheric shape of an image side surface of a fourth lens in the imaging lens according to Example 4.
Figure 11:
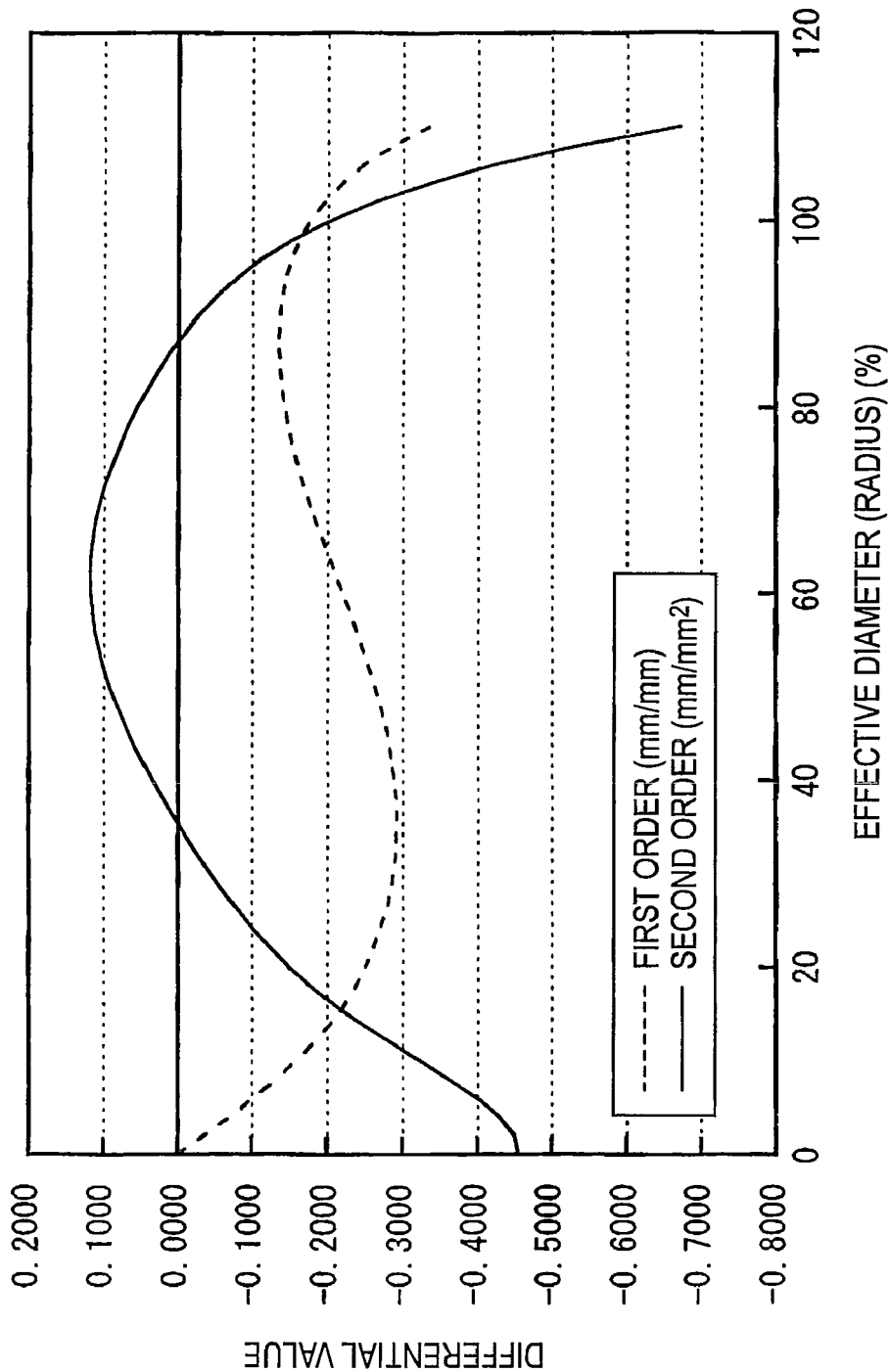
FIG. 11 is a characteristic diagram illustrating differential values of an expression that represents an aspheric shape of an image side surface of a fourth lens in the imaging lens according to Example 5.
Figures 13A, 13B, 13C:
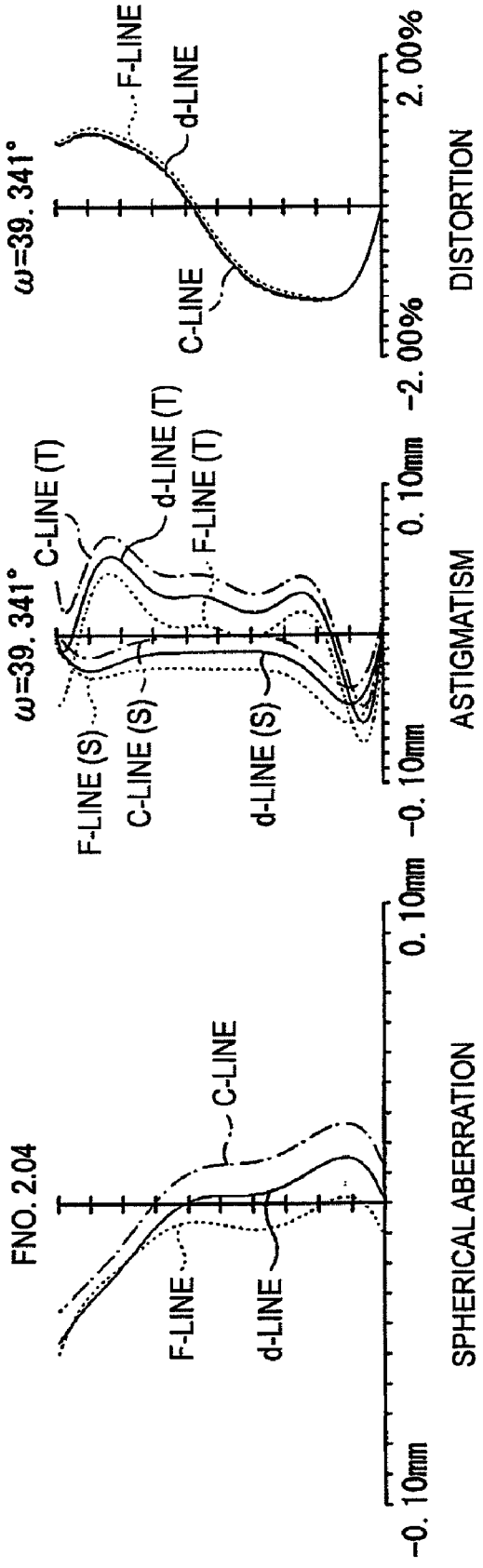
FIGS. 13A to 13C are aberration diagrams illustrating aberrations of the imaging lens according to Example 1, where
Figures 15A, 15B, 15C:
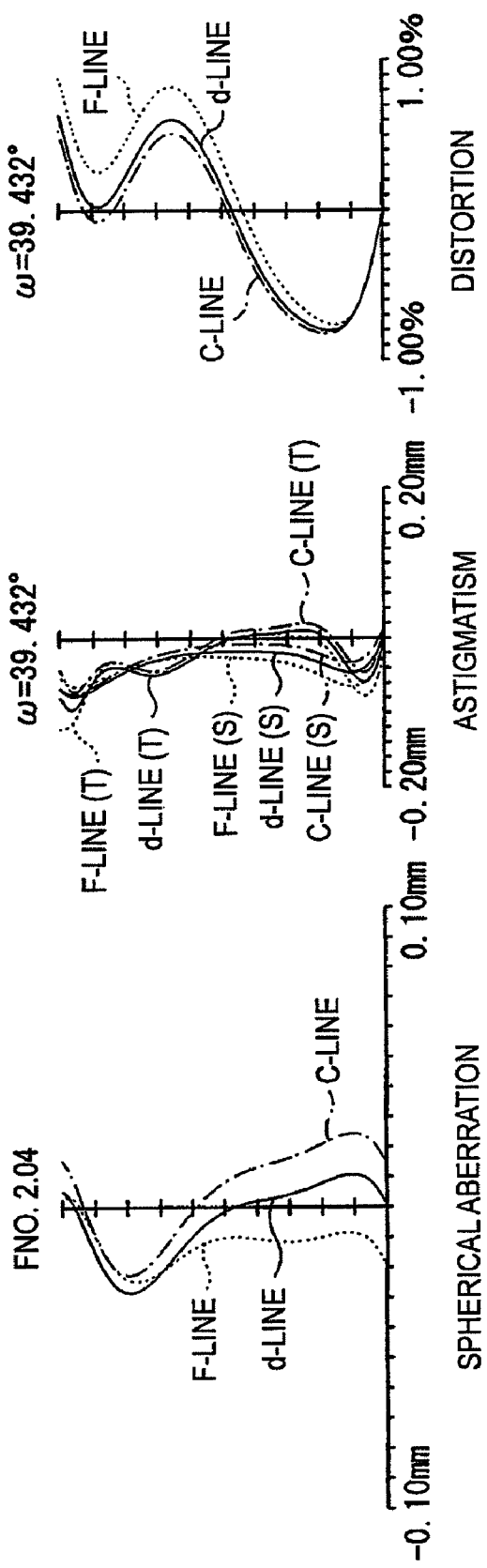
FIGS. 15A to 15C are aberration diagrams illustrating aberrations of the imaging lens according to Example 3, where
Figures 16A, 16B, 16C:
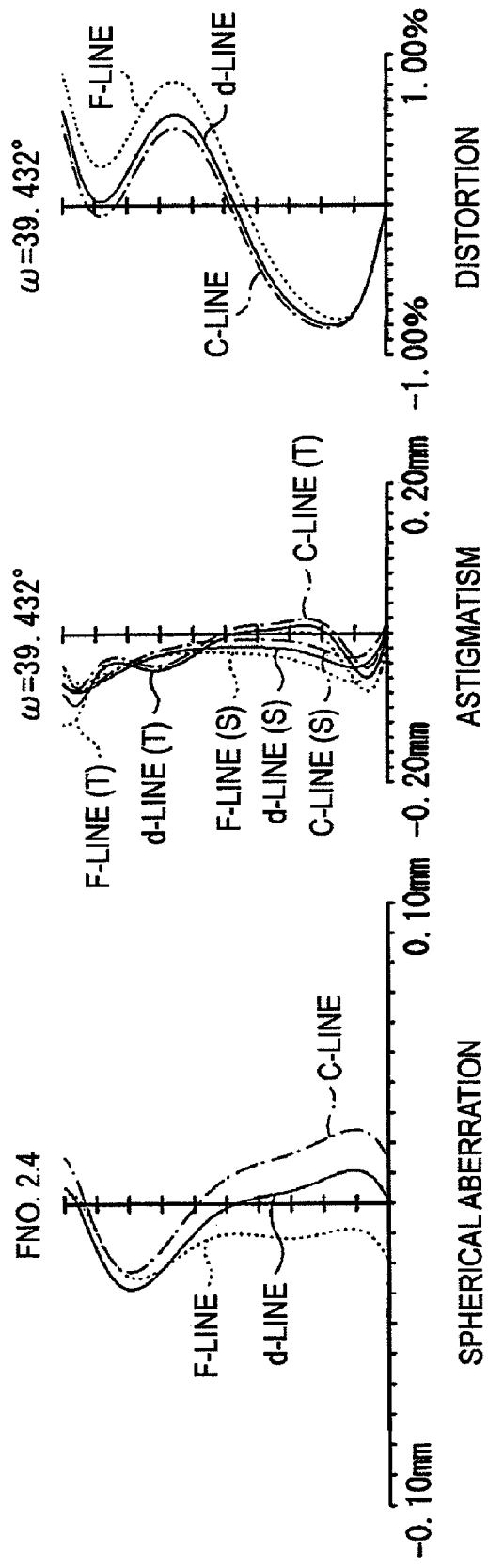
FIGS. 16A to 16C are aberration diagrams illustrating aberrations of the imaging lens according to Example 4, where

FIGS. 13A to 13C show spherical aberration, astigmatism, and distortion in the imaging lens according to Example 1, respectively. In the aberration diagrams, there are aberrations at the C-line (a wavelength 656.27 nm) and the F-line (a wavelength 486.13 nm) when the d-line is set as a reference wavelength. In the astigmatism diagram, the reference sign (S) represents aberrations in the sagittal direction, and the reference sign (T) represents aberrations in the tangential direction. The ω represents a half angle of view. In FIG. 13A, the vertical axis represents a diameter (m) of the entrance pupil.

Likewise, FIGS. 14A to 14C show various aberrations in the imaging lens according to Example 2. Likewise, FIGS. 15A to 15C to FIGS. 18A to 18C show various aberrations in the imaging lens according to Examples 3 to 6. Furthermore, in FIGS. 17B and 17C, the vertical axis represents the image height Y (mm).

As can be seen from the numerical data and the aberration diagrams mentioned above, with the lens configuration using a total of five elements, the imaging lens with high resolution performance is embodied in accordance with each of the examples.

In addition, the invention is not limited to the embodiments and the examples, and may be modified to various forms. For example, the values of the radius of curvature, the on-axis surface spacing, the refractive index, and the like of the lens components are not limited to the values shown in the numerical examples, and may have different values.

What is claimed is:

1. An imaging lens comprising: in order from an object side thereof,
   a first lens having a positive refractive power;
   a second lens having a negative refractive power;
   a third lens having a convex surface on an image side near the optical axis thereof and having a positive refractive power;
   a fourth lens having a positive refractive power near the optical axis thereof; and
   a fifth lens having a negative refractive power near the optical axis thereof, wherein an image side surface of the fifth lens is concave near the optical axis, wherein
   an object side surface of the first lens is convex toward the object side near the optical axis,
   an image side surface of the fourth lens is convex toward an image side near the optical axis,
   the image side surface of the fifth lens is configured to be an aspheric surface which has a concave shape near the optical axis and has a convex shape in the peripheral portion, and
   the imaging lens has a total of five lenses.

2. The imaging lens according to claim 1, wherein the following conditional expression is satisfied:

$$0.8 < f/f1 < 1.5 \qquad (1)$$

wherein f1 is a focal length of the first lens and f is a focal length of the imaging lens.

3. The imaging lens according to claim 1, wherein the following conditional expression is satisfied:

$$f1 < |f2| < f3 \qquad (2)$$

wherein f1 is a focal length of the first lens, f2 is a focal length of the second lens, and f3 is a focal length of the third lens.

4. The imaging lens according to claim 1, wherein the following conditional expression is satisfied $$vd2 < 35 \qquad (3)$$

wherein vd2 is an Abbe number of the second lens at the d-line.

5. The imaging lens according to claim 1, wherein
when an aspheric shape at a height h from a vertex of a lens surface is expressed by a aspheric surface expression, a first order differential value of the aspheric surface expression represents a slope of the lens surface at the height h, and a second order differential value thereof represents a displacement of the slope of the lens surface,
assuming that a minimum height, at which an algebraic sign of the second order differential value is changed, from the optical axis is ha, a height at a maximum effective radius is hmax, and a height at 70 percent of the maximum effective radius is 0.7 hmax,
an image side surface of the fourth lens has an aspheric shape satisfying the following expression:

$$ha < 0.7 hmax \qquad (4).$$

6. The imaging lens according to claim 1, wherein both surfaces in each of the first lens, the second lens, the third lens, the fourth lens, and the fifth lens are aspheric.

7. An imaging apparatus comprising:
   an imaging lens according to claim 1; and
   an imaging device for outputting an imaging signal based on an optical image formed by the imaging lens.

8. A portable terminal device comprising:
   an imaging apparatus according to claim 7; and
   a display unit that displays an image taken by the imaging apparatus.

9. An imaging lens comprising: in order from an object side thereof,
   a first lens having a positive refractive power;
   a second lens having a negative refractive power;
   a third lens having a convex surface on an image side near the optical axis thereof and having a positive refractive power;

a fourth lens having a positive refractive power near the optical axis thereof; and a fifth lens having a negative refractive power near the optical axis thereof, wherein an image side surface of the fifth lens is concave near the optical axis, wherein an object side surface of the first lens is convex toward the object side near the optical axis, an image side surface of the fourth lens is convex toward an image side near the optical axis, the following conditional expression is satisfied:

$$f1<|f2|<f3$$

wherein f1 is a focal length of the first lens, f2 is a focal length of the second lens, and f3 is a focal length of the third lens, and when an aspheric shape at a height h from a vertex of a lens surface is expressed by a aspheric surface expression, a first order differential value of the aspheric surface expression represents a slope of the lens surface at the height h, and a second order differential value thereof represents a displacement of the slope of the lens surface, assuming that a minimum height, at which an algebraic sign of the second order differential value is changed, from the optical axis is ha, a height at a maximum effective radius is hmax, and a height at 70 percent of the maximum effective radius is 0.7 hmax, an image side surface of the fourth lens has an aspheric shape satisfying the following expression:

$$ha<0.7hmax.$$

* * * * *